(12) United States Patent
Mah

(10) Patent No.: US 11,884,425 B2
(45) Date of Patent: Jan. 30, 2024

(54) SPACECRAFT WITH ARTIFICIAL GRAVITY MODULES

(71) Applicant: United States of America as Represented by the Administrator of NASA, Washington, DC (US)

(72) Inventor: Robert Weber Mah, Cupertino, CA (US)

(73) Assignee: United States of America as Represented by the Administrator of NASA

( * ) Notice: Subject to any disclaimer, the term of this patent is extended or adjusted under 35 U.S.C. 154(b) by 0 days.

(21) Appl. No.: 17/653,644

(22) Filed: Mar. 4, 2022

(65) Prior Publication Data

US 2023/0278728 A1 Sep. 7, 2023

(51) Int. Cl.
*B64G 1/46* (2006.01)
*B64G 1/60* (2006.01)

(52) U.S. Cl.
CPC .................. *B64G 1/46* (2013.01); *B64G 1/60* (2013.01)

(58) Field of Classification Search
CPC ............. B64G 1/12; B64G 1/60; B64G 1/46
See application file for complete search history.

(56) References Cited

U.S. PATENT DOCUMENTS

| | | |
|---|---|---|
| 3,300,162 A | 1/1967 | Maynard et al. |
| 10,099,805 B2 | 10/2018 | Dharmaraj |
| 10,207,826 B2 | 2/2019 | Dharmaraj et al. |
| 2006/0163434 A1* | 7/2006 | Patel ................. B64G 1/60 244/158.3 |
| 2015/0108280 A1 | 4/2015 | Willard, Jr. |
| 2017/0197737 A1* | 7/2017 | Dharmaraj ............ B64G 1/12 |

OTHER PUBLICATIONS https://www.merriam-webster.com/dictionary/celestial%20body.*
https://www.merriam-webster.com/dictionary/celestial.*
Zipper https://www.youtube.com/watch?v=-8JYmGZgz14 Jun. 24, 2016 (Year: 2016).*

(Continued)

*Primary Examiner* — Jessica B Wong
(74) *Attorney, Agent, or Firm* — Rhys W. Cheung; Robert M. Padilla; Trenton J. Roche

(57) ABSTRACT

A spacecraft capable of generating an artificial gravity environment comprises frame with a circular track with at least two modules traveling on the track. The two modules are configured to engage the first track opposite the first module to minimize mass imbalance, and a balancing system for the first and second modules configured to mass balance the first and second modules relative to each other. The frame itself does not rotate, and may have other mission supporting structures attached, including storage and supply modules, and observational modules, and spacecraft hangars and spacecraft docking modules. A method of operating a spacecraft to generate artificial gravity in a habitation module comprises operating a frame in space, propelling first and second habitation modules about the frame to generate artificial gravity environments in the modules, and mass balancing the first module relative to the second module to maintain balance of the spacecraft.

19 Claims, 13 Drawing Sheets

(56) References Cited

OTHER PUBLICATIONS

Mah, Robert W., "Development of telescope balancing methodologies for SOFIA", Proc. SPIE 3354, Infrared AstronomicalInstrumentation, doi: 10.1117 12.317238, (Aug. 21, 1998), 10 pages.

Wilson, Edward, "MCRLS For on-Line Spacecraft Mass—and Thruster-Property Identification", Proceedings of the IASTED International Conference on Intelligent Systems and Control, Honolulu, HI,, (Aug. 2004), 6 pages.

Wilson, Edward, "Automatic Balancing and Intelligent Fault Tolerance for a Space-Based Centrifuge", Proceedings of the 2005 AIAA Guidance, Navigation, and Control Conference, San Francisco, California,, (Aug. 2005), 53 pages.

* cited by examiner

SPACECRAFT WITH ARTIFICIAL GRAVITY MODULES

ORIGIN OF INVENTION

The invention described herein was made by an employee of the United States Government and may be manufactured and used by or for the Government of the United States of America for governmental purposes without the payment of any royalties thereon or therefor.

BACKGROUND OF THE INVENTION

Technical Field of the Invention

The present disclosure relates generally to spacecraft for outer space exploration and commercialization.

More specifically, the present disclosure relates to spacecraft capable of generating artificial gravity environments.

Description of the Prior Art

Space travel is becoming more and more accessible in recent years with the advancement of private space programs, such as those underway by Blue Origin, SpaceX and Sierra Nevada Corporation. Trips into space can be as short as minutes or hours aboard spacecraft intended solely to provide a brief space experience to travelers or deliver cargo to space. However, there is a growing demand for overnight space habitation as the space tourism industry grows. Furthermore, non-commercial space programs, such as NASA's Mars Exploration Program, are investigating long term space exploration trips that can last months or years before a return to the gravity of Earth is contemplated.

For both space tourism and space exploration, there is interest in generating artificial gravity in space for entertainment purposes and health concerns, respectively. For example, space tourists can be interested in experiencing different types of gravitational environments outside of the zero gravity (0G) environment of space and the 1G environment of Earth, such as a 0.4G partial gravity environment that simulates gravity of the Moon. Furthermore, it is desirable to replicate the 1G environment of Earth in space over a long period of time for long term space exploration operations to minimize health risks of 0G exposure.

While short term or intermittent exposure to a 0G environment appears to not pose a health risk, long term exposure has been found to pose significant risk for negative health effects on the human body including, for example, deterioration of the skeleton, muscle atrophy, balance disorders, eyesight disorders, changes in the immune system, reverse blood flow, and clotting in the jugular vein.

Conventional systems for generating artificial gravity in space involve large rotating space stations that create an inertial force that mimics the effects of a gravitational force. In such examples, the entire space station rotates to generate the artificial gravity. For example, the Gateway foundation, doing business as Orbital Assembly Corporation, has plans to commercialize a large rotating space station for space tourism purposes. Other examples of rotating spacecraft are described in U.S. Pat. No. 3,300,162 to Maynard et al.; U.S. Pat. No. 10,207,826 to Dharmaraj et al.; U.S. Pat. No. 10,099,805 to Dharmaraj et al.; Pat. Pub. No. US 2006/0163434 to Patel et al.; and Pat. Pub. No. US 2015/0108280 to Willard, Jr.

SUMMARY OF THE INVENTION

The present inventor has recognized that problems to be solved with generating artificial gravity with large rotating structures include, among other things, 1) the difficulty in docking other spacecraft to the rotating spacecraft; 2) the need to mass balance the entire rotating space craft in order to eliminate or minimize rotational imbalance; 3) the need to mass balance the spacecraft in real-time so as to minimize passenger discomfort and structural stress on the spacecraft; 4) the generation of extraneous Coriolis effect on spacecraft inhabitants; 5) the potentially prohibitive cost, time and schedule to build such a large rotating system; and 6) the absence or minimal presence of non-rotating structure for 0G research and industrial use.

The present disclosure can help provide solutions to these and other problems by providing systems, devices and methods relating to a non-rotating spacecraft to which are connected modules moving thereon that can be used for habitation and other purposes. The spacecraft can be a simple frame having a track to facilitate movement of the habitation modules, an orbiting space station or a space-traveling vessel. Habitation modules can be accelerated to a constant angular velocity to generate artificial gravity environments for passengers to, among other things entertain passengers and alleviate health risks, while the other portions of the spacecraft can remain stationary to facilitate other functions, such as spacecraft docking and zero gravity research.

As such, the present disclosure can help solve the problems referenced above and other problems by 1) providing modular artificial gravity structures that can be added and removed from a non-rotating structure as desired; 2) providing modules that are more easily built and balanced; 3) providing a stationary structure that can provide a platform for other components that do not need gravity to function; and 4) reducing or eliminating Coriolis effect on occupants in habitation modules.

In an example, a spacecraft capable of generating artificial gravity can comprise a first track having a geometric center and a rotation axis extending through the center, the first track defining a path surrounding the center, a first module configured to engage and travel along the first track to travel around in a circular-type path with curvilinear motion and generate an artificial gravity environment within the first module through centripetal force, a second module configured to engage the first track opposite the first module in a circular-type path with curvilinear motion and generate an artificial gravity environment through centripetal force, and a balancing system for the first and second modules configured to mass balance the first and second modules relative to each other.

In another example, a method of operating a spacecraft to generate artificial gravity in a habitation module can comprise operating a frame in space, engaging a first and a second habitation module, moving the first and second habitation modules about the frame, and mass balancing the first module relative to the second module to maintain balance of the spacecraft.

In an additional example, a spacecraft capable of generating artificial gravity can comprise a first substantially circular track enclosing an area with a geometric center, the spacecraft capable of generating an artificial gravity environment and orbiting a lunar or planetary mass, a first module configured to travel via engagement with the first track in a circular-type path with curvilinear motion and generate artificial gravity through centripetal force, a second module configured to travel via engagement with the first track opposite the first module to in a circular-type path with curvilinear motion and generate artificial gravity through centripetal force, and a balancing system for the first and second modules configured to mass balance the first and second modules relative to each other to reduce overall imbalance of the spacecraft.

DETAILED DESCRIPTION OF THE INVENTION

Figure 1:
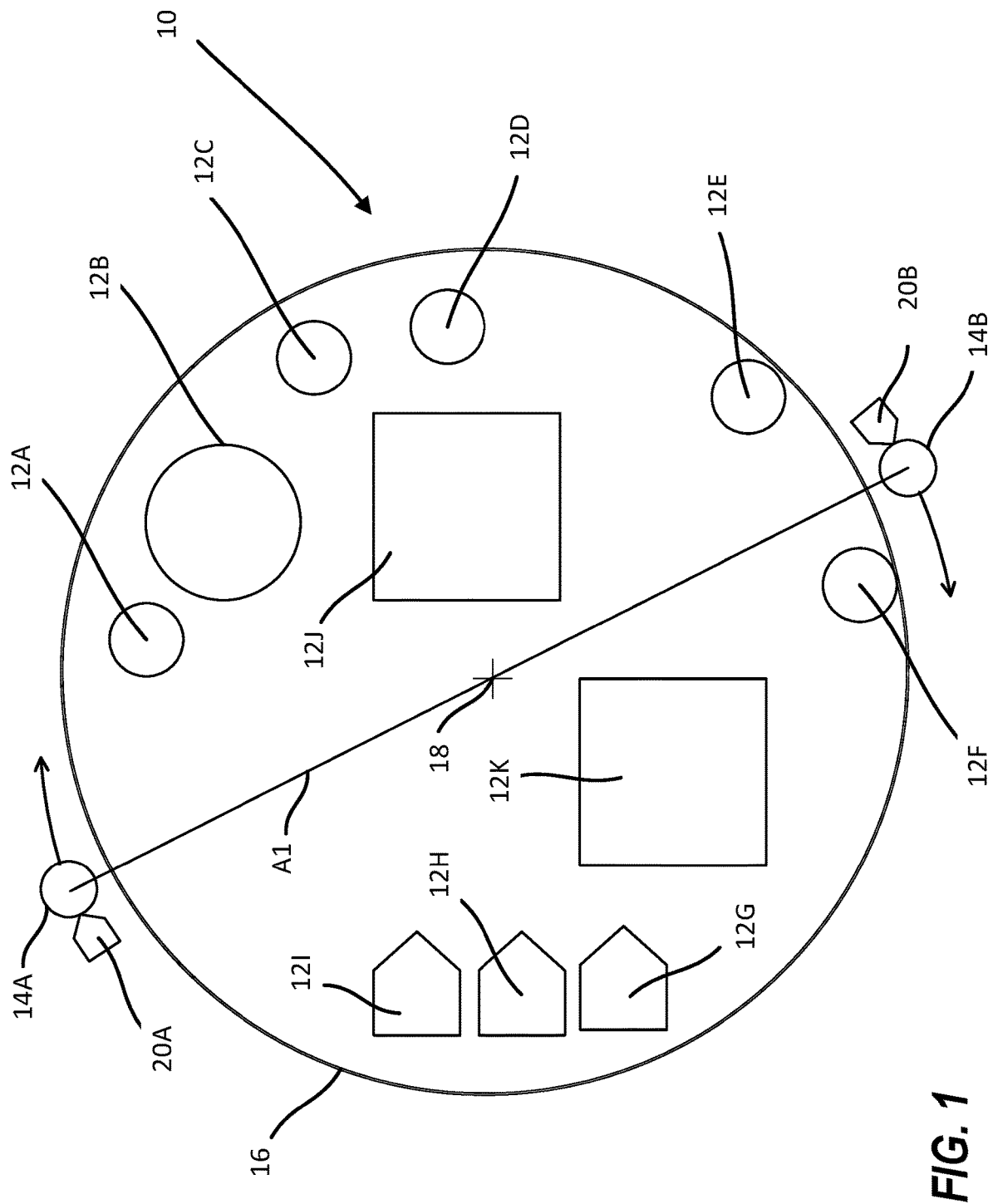
FIG. 1 is a schematic view of a spacecraft including a plurality of different operational modules and a pair of opposing habitation modules configured to generate artificial gravity, according to some embodiments.
Figure 1A:
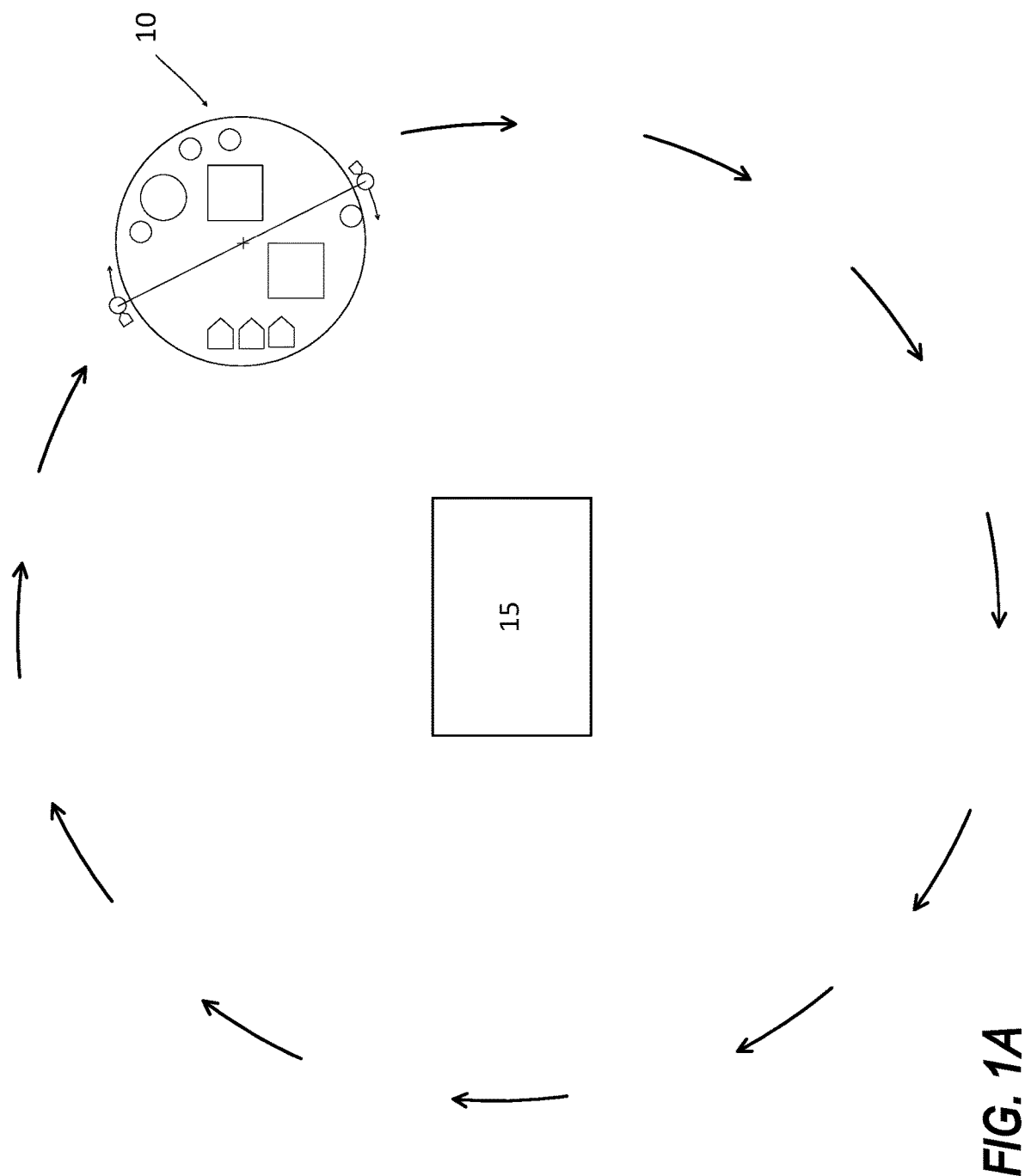
FIG. 1A is a schematic view of spacecraft 10 operating in space to orbit a lunar or planetary mass, according to some embodiments.

FIG. 1 is a schematic view of spacecraft 10 including a plurality of different operations modules 12A-12K and a pair of opposing habitation modules 14A and 14B configured to generate an artificial gravity experience and environment for module occupants and contents. Spacecraft 10 can comprise substantially circular frame 16, which in some embodiments includes a platform upon which other components can be mounted and upon which habitation modules 14A and 14B can be configured to travel. As discussed herein, habitation modules 14A and 14B can be propelled around frame 16 to generate artificial gravity for module occupants and contents, while frame 16 can be left to orbit in space or travel directionally in space, e.g., via thrusters, without itself rotating. FIG. 1A is a schematic view of spacecraft 10 left to orbit in space, which includes spacecraft 10 orbiting a lunar or planetary mass 15, according to some embodiments.

Frame 16 can be configured as a simple rail or track that habitation modules 14A and 14B can be operated with. Thus, the inside of frame 16 of FIG. 1 do not have other structures 12A-12K as shown. In some embodiments, an attitude control system keeps frame 16 stationary in orbit, or non-rotating, while traveling directionally in space. However, frame 16 can include additional structures upon which operations modules 12A-12K can be mounted to allow frame 16 to function as a space station or spacecraft. Thus, the inside of frame 16 of FIG. 1 can include beams, struts, or other supporting structures to mount operations modules 12A-12K. In examples, frame 16 can comprise an independently functioning vessel having passageways and spaces for personnel and equipment to be located. Thus, the inside of frame 16 in FIG. 1 can be constructed with a skin structure on all or part of the frame that both provides support for operations modules 12A-12K and houses useable space. However, frame 16 can be configured to operate in orbit or operate while being propelled through space without generating rotational motion. Thus, frame 16 can be considered a stationary structure, e.g., non-rotating about center 18, relative to habitation modules 14A and 14B.

Operations modules 12A-12K can comprise various modules, such as spacecraft refueling modules, space telescope modules, solar panel modules, thermal control modules, attitude and/or navigation control modules, communications modules, science and research modules, manufacturing modules, habitation modules, equipment resupply modules, storage modules, water treatment and storage modules, spacecraft docking modules, waste management modules, habitation storage modules, observational modules, and spacecraft hangars. Thus, operations modules 12A-12K can allow spacecraft 10 to operate with other spacecraft or to function as an individually operating space station or space travelling vessel. Operational modules 12A-12K can be configured to operate in zero gravity environments due to coupling with frame 16. However, in examples, operations modules 12A-12K can be repositioned to travel along frame 16, like habitation modules 14A and 14B, for orbit and gravity generation using suitable elevators, tracks, or transport devices, such as those described herein.

Habitation modules 14A and 14B can be configured as housing structures in which personnel of spacecraft 10 can live. As such, habitation modules 14A and 14B can include rooms having walls, floors and ceilings, bathrooms, sleeping areas, kitchens, and the like. Habitation modules 14A and 14B can be configured to be propelled about frame 16 at one or more angular velocities to generate artificial gravity without requiring a particular motion or rotation of frame 16. In examples, habitation modules 14A and 14B can comprise thrusters 20A and 20B, respectively. However, habitation modules 14A and 14B can be propelled by other means, such as rotary motors, electromagnetic propulsion, ionic propulsion, gas propulsion, and electric propulsion. Frame 16 can comprise structures that habitation modules 14A and 14B can engage with, such as rails, tracks, channels, passageways and the like to, for example, prevent habitation modules 14A and 14B from separating from frame 16 and allow for the generation of inertia. Habitation modules 14A and 14B can be operatively connected to frame 16 via any suitable means to facilitate traveling upon frame 16, such via the means described herein. In examples, bearing assemblies 40 (FIG. 3) can be used to attach habitation modules 14A and 14B to frame 16.

In examples, frame 16 can have a circular outer perimeter that defines center 18. However, frame 16 can embody other shapes such as oval, capsule or elliptical. Circular shapes are, however, easier for the generation of constant acceleration that produces a consistent artificial gravity experience within habitation modules 14A and 14B. Frame 16 can comprise a large diameter ring structure. In examples, frame 16 can have a diameter of approximately 1,400 feet (~427 meters) or larger, or at least the size necessary to eliminate Coriolis effects or reduce them to a tolerable level for human or animal occupants, while generating the desired amount of artificial gravity effect for the habitation modules. As explained herein, having a diameter of approximately 1,400 feet or larger can help reduce or eliminate Coriolis effects, particularly when combined with an orbital speed of less than approximately two revolutions per minute. In examples, habitation modules 14A and 14B can be configured to operate on opposites sides of frame 16 along axis A1, at approximately one-hundred-eighty degrees apart or a suitable distance for balancing frame 16 to reduce the need to use corrective propulsion to maintain its stability and avoid wobble. Habitation modules 14A and 14B can be individually propelled along frame 16 without coupling or tethering to each other. As such, frame 16 can comprise a non-rotating space station comprising a non-rotating large diameter ring structure. In examples, there can be two habitation modules 14A and 14B positioned at opposite positions or other positions to achieve balance of the whole spacecraft structure while traveling on a circular rail 30 (FIG. 2), for example, at one-hundred-eighty degrees apart, and can travel at a constant velocity to generate artificial gravity at each module. In addition, other modules, including additional habitation modules, service modules and transport modules, such as can be arranged in balanced pairs on rail 30 or other rails, can be used to service, resupply, and transport people to and from habitation modules 14A and 14B, as is discussed below with reference to FIGS. 6-12. While frame 16 has been described to have geometric shapes such as circular, oval, or elliptical, it is understood by those of skill in the art that due to manufacturing imperfections, embodiments of frame 16 can be of an irregular closed shape approximating the geometric shapes without departing from the scope and spirit of the inventive concepts disclosed herein.

In view of the foregoing, spacecraft 10 can be configured to provide all the benefits of having artificial gravity in a spacecraft for entertainment and health purposes, without the complexity and energy cost of a completely rotating spacecraft. Habitation modules 14A and 14B can be operated together to generate any desired level of artificial gravity for the occupants of the modules, and frame 16 can be operated as a stationary craft to, among other things, facilitate docking with other spacecraft, such as supply vehicles. In general, docking a spacecraft to a fully rotating space station can be a challenging and risky operation. Spacecraft docking operations are, however, desirable for re-supplying spacecraft 10 and for transporting space explorers to and from it. Docking other spacecraft to spacecraft 10 is made easier by the relative stationary operation of frame 16.

The stationary large diameter ring structure of frame 16 can allow for easy addition and evolution of future capabilities of spacecraft 10. In comparison, adding new capabilities to a rotating space station is very difficult because any addition would create a mass imbalance problem that will affect the motion of the rotating space station.

Figure 2:
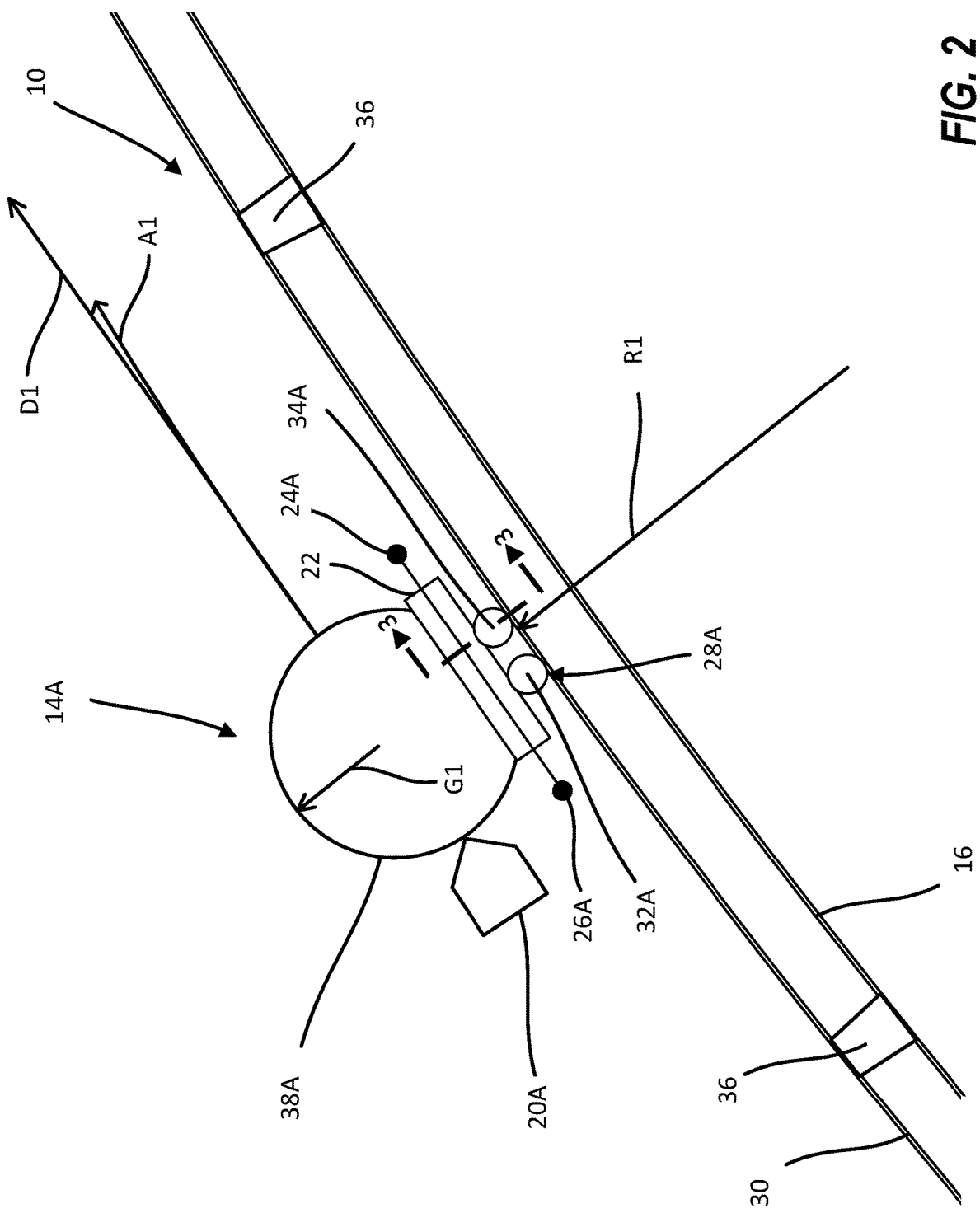
FIG. 2 is a schematic view of a habitation module comprising a thruster, coupling hitches and a bearing assembly configured to engage a rail of a spacecraft, according to some embodiments.

FIG. 2 is a schematic view of habitation module 14A comprising thruster 20A, chassis 22, coupling hitches 24A and 26A and bearing assembly 28A configured to engage rail 30 of spacecraft 10. Bearing assembly 28A can comprise engagement features 32A and 34A. Habitation module 14A can comprise housing 38A, which can comprise walls within which features are provided for occupation by users and passengers, such as beds, kitchens, toilets and bathing facilities. FIG. 2 is shows habitation module 14A, and habitation module 14B can be configured similarly.

As discussed, frame 16 can itself comprise rail 30. However, in additional examples and as shown in FIG. 2, a separate, dedicated rail 30 can be attached to frame 16 such that frame 16 comprises other structural components, e.g., beams and struts, supporting operations modules 12A-12K. Rail 30 can be attached to frame 16 via brackets 36. The number and spacing of brackets 36 can be selected based on design needs. Additionally, frame 16 can comprise a plurality of rails to which habitation module 14A can attach, such as a second rail 30 further into the plane of FIG. 2. As such, rail 30 is one of a pair of parallel rails forming a track. While embodiments herein are described in terms of one rail 30, it is understood that multiple rails can be employed as necessary according to other embodiments.

Engagement features 32A and 34A can comprise features that perform one or both of attaching habitation module 14A to rail 30 and facilitating movement of habitation module 14A relative to rail 30. Engagement features 32A and 34A can keep habitation module 14A at a fixed radial distance R1 from center 18 (FIG. 1), and also keep habitation module 14a coupled to rail 30. In examples, engagement features 32A and 34A can comprise wheels or bearings. For example, engagement features 32A and 34A can be configured as a plurality of pairs of wheels that roll along the top, bottom and side of rail 30, similar to those used on roller coasters as are described in Pub. No. US 2018/0318722 to Smith et al., which is hereby incorporated by reference in its entirety. In examples, engagement features 32A and 34A can comprise air bearings, as is discussed in detail with reference to FIG. 3. Engagement features 32A and 34A can each be one of a pair of engagement features with the paired engagement features being located, for example, further into the plane of FIG. 3 to engage a second instance of rail 30.

Thruster 20A can be used to propel habitation module forward in direction D1. However, due to coupling to rail 30 via bearing assembly 28A, habitation module 14A can move along arcuate path A1. Accordingly, artificial gravity is generated in the direction of arrow G1. Propulsion at a constant speed for a circular frame 16 can produce a consistent gravitational effect. The speed at which thruster 20A propels habitation module 14A correlates to the amount of gravity at G1. Likewise, the length of radius R1 is directly proportional to the magnitude of gravity at G1 for a given speed. Furthermore, increasing the length of radius R1 will reduce the adverse effects of the Coriolis forces on a user of habitation module 14A. Studies have shown that a revolutionary period of more than 30 s, or less than 2 revolutions per minute, can mitigate dizziness, nausea and disorientation caused by Coriolis effects on a person subject to rotational force. The radius required with such restrictions on rpm to produce the standard Earth gravity of 1G can be calculated by using the centripetal force formula Eq. 1:

$$R = a\left(\frac{T}{2\pi}\right)^2, T > 0 \qquad (1)$$

where R is the rotational radius, a is the acceleration or gravity, T is the rotational period in seconds. To have a revolutionary period of less than 2 rpm, then a radius R=~223 meters (733 feet) would be the minimum radius needed for a gravitation acceleration of a=1G (9.8 m/s$^2$). At that size, the constant velocity around frame 16 would be approximately 46.7 m/s, or 104 mph to make one revolution in 30s at 2 rpm. For a circular rail 30, the angular velocity, acceleration, and speed can be set at a constant rate. For other shapes of rail 30, the angular acceleration and speed can be adjusted to maintain a consistent gravitational effect.

Figure 10:
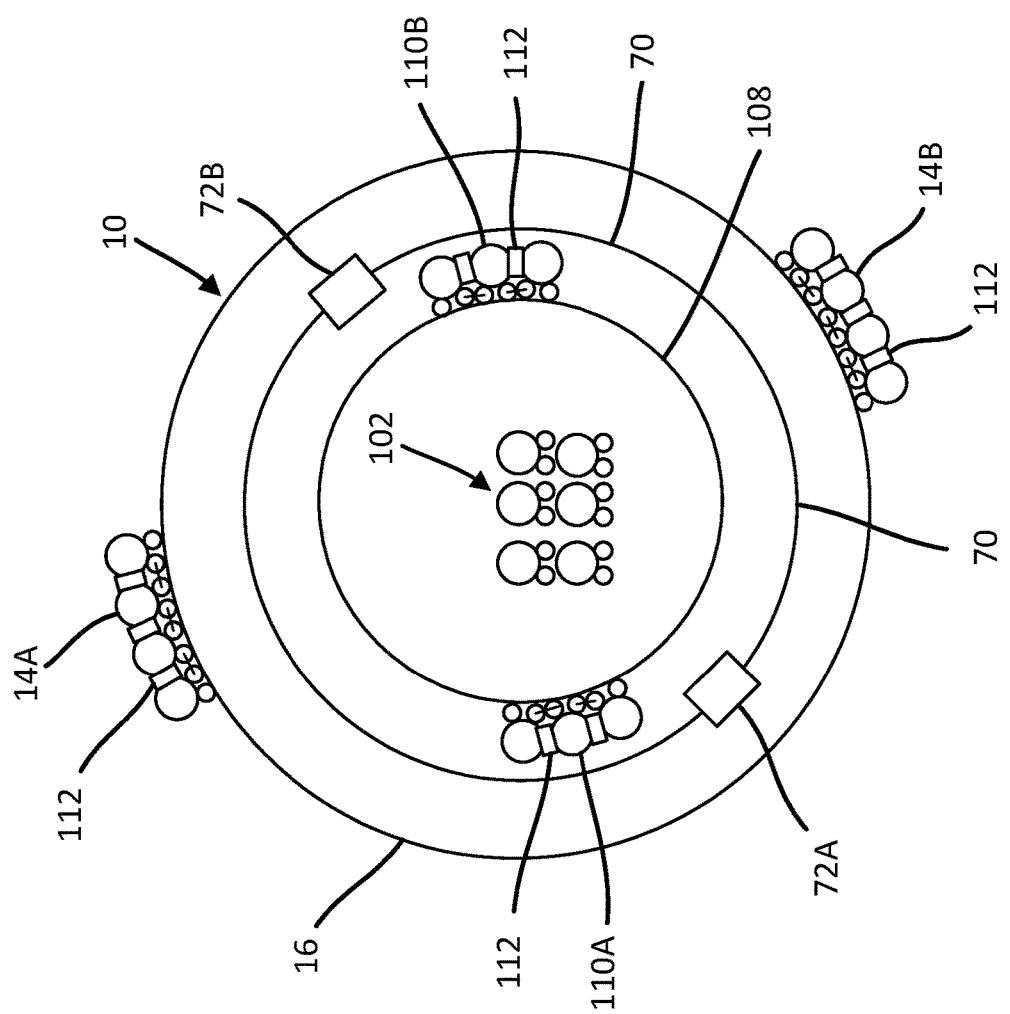
FIG. 10 is a schematic view of a plurality of habitation modules being linked in trains on different rails, according to some embodiments.

Habitation module 14A can be provided with other features to facilitate operation with frame 16 and other modules. Chassis 22 can be used as a platform for the linking of housing 38A and engagement features 32A and 34A to link habitation module 14A to rail 30. Chassis 22 can include coupling hitches 24A and 26A to link habitation module 14A to other modules, as is shown in FIGS. 8B and 10, for example. Coupling hitches 24A and 26A can comprise devices to allow for selective linking and unlinking of other modules forward and aft of habitation module 14A. Coupling hitches 24A and 26A can comprise any suitable connectors, such as pinned connectors, chained connections, and connectors common in the railroad industry, such as Janney couplers and Tomlinson couplers. In examples, coupling hitches 24A and 24B can comprise electric or magnetic couplers. Also, coupling hitches 24A and 24B can be used to form electrical connections between modules, such as for electric power, communications and the like, and fluid connections between modules, such as for mass balancing, water resupply, waste management and the like. Though not shown in FIG. 2 for simplicity, chassis 22 can be provided with braking devices to control the velocity to provide steady amounts of artificial gravity and slow or stop movement of habitation module 14A on rail 30. The braking devices can comprise any suitable device as is known in the art.

Figure 3:
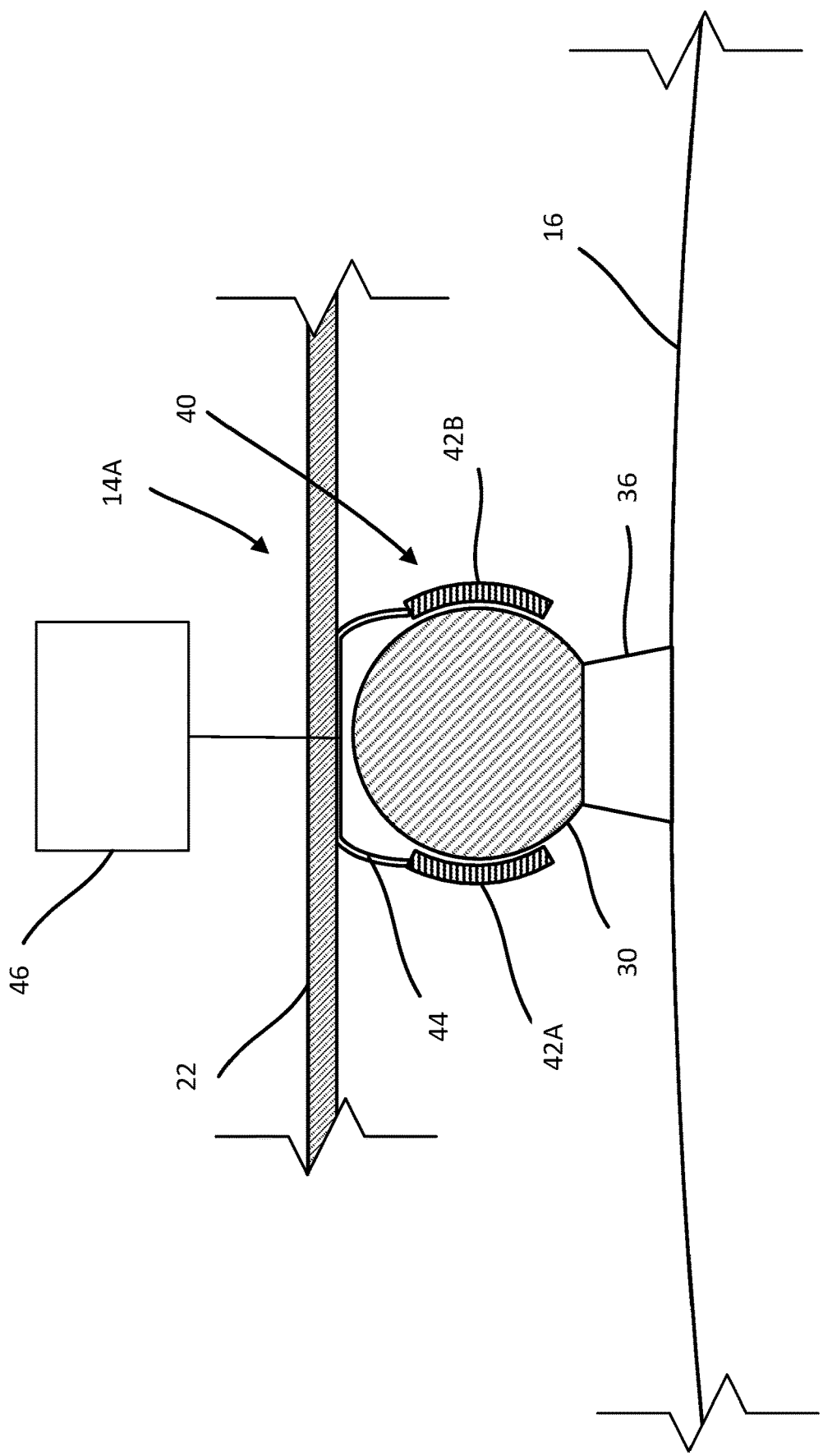
FIG. 3 is a schematic cross-sectional view of a bearing assembly for coupling an orbiting habitation module to a rail of a spacecraft, according to some embodiments.

FIG. 3 is a schematic cross-sectional view of bearing assembly 40 for coupling habitation module 14A to rail 30 of spacecraft 10. FIG. 3 is taken at section 3-3 of FIG. 2 looking in the circumferential direction. Bearing assembly 40 can comprise first bearing 42A, second bearing 42B and bracket 44. Rail 30 can be attached to frame 16 of spacecraft 10 via bracket 36. Bracket 44 can be attached to chassis 22 of habitation module 14A. Bearings 42A and 42B can extend from bracket 44 to partially surround rail 30. Air source 46 can be connected to bearings 42A and 42B to provide pressurized air thereto. Each of engagement features 32A and 34A of FIG. 2 can comprise an instance of bearing assembly 40. In examples, habitation module 14A can be provided with four or more of bearing assemblies 40 to provide stability to habitation module 14A.

Rail 30 can comprise an elongate structure extending around the circumference of frame 16. Rail 30 can comprise a plurality of arcuate segments connected together. In the illustrated example, rail 30 is shown having a circular cross-sectional area. However, other cross-sectional areas can be used, such as square, rectangular, hexagonal and the like. Rail 30 can comprise a solid structure or can be tubular.

Bracket 36 can comprise any suitable structure for fixing, e.g., immobilizing, the position of rail 30 relative to frame 16. Bracket 36 can extend rail 30 a distance away from frame 16 to provide suitable clearance for the operation of bearing assembly 40. Thus, housing 38A (FIG. 2) can be positioned a distance above frame 16. However, habitation module 14A can be configured such that housing 38A is recessed into frame 16.

Bearings 42A and 42B can be curved to fit around the curvature of rail 30 to prevent bearing assembly 40 and housing 38A attached thereto from separating from frame 16. Thus, bearings 42A and 42B can simultaneously provide a coupling between habitation module 14A and rail 30 and allow for a low friction, rolling or sliding arrangement.

Figure 12:
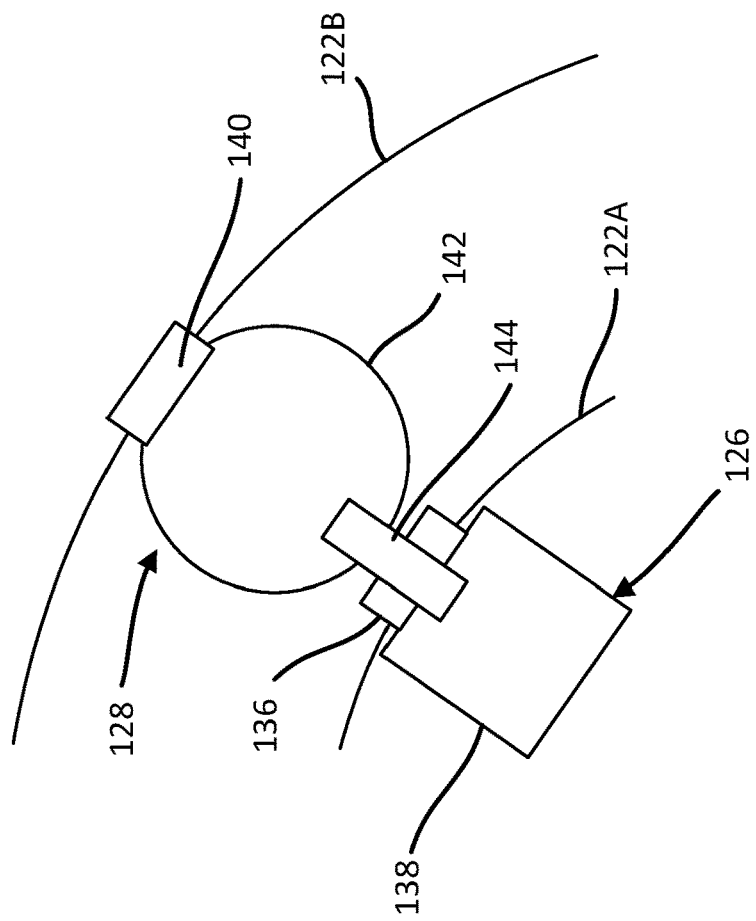
FIG. 12 is a schematic view of concentric rails illustrating an overhead-mounted transportation module transferring cargo from the inner rail to an overhead-mounted habitation module on the outer rail, according to some embodiments.

FIG. 3 illustrates habitation module 14A mounted to the outer diameter side of rail 30. In examples, habitation module 14A can be configured to extend radially inward from frame 16, rail 30 or another structure such that bearing assembly 40 is positioned on the radially outer side of habitation module 14A, as shown in FIG. 12, as opposed to the radially inner side of habitation module 14A, as shown in FIGS. 1-3. Operation of habitation module 14A and bearing assembly 40 inside rail 30 can provide a fail-safe for bearing assembly 40 by rail 30 forming a barrier to separation of habitation module 14A from spacecraft 10 due to centrifugal forces acting to push habitation module 14A into the inside curvature of rail 30, as opposed to pulling away from the outer curvature of rail 30.

Bearing assembly 40 can be configured to reduce friction between habitation module 14A and rail 30 or frame 16. Reduction of friction can reduce the amount of work needed to be performed by thruster 20A (FIG. 2), as well as the amount of fuel or energy spacecraft 10 has to have available, thereby saving space and weight. Reduction of friction can additionally reduce noise and vibration within housing 38, thereby improving user experience.

Bearing assembly 40 can comprise air bearings, which can utilize pressurized air to cushion chassis 22 from contact against rail 30. Thus, an air cushion can be provided between chassis 22 and rail 30 that reduces friction, noise and vibration. Bearings 42A and 42B can be configured to discharge pressurized air, such as air from air source 46, against rail 30. Bracket 44 can thus comprise a hollow structure configured to direct air from air source 46 to bearings 42A and 42B. The force of the pressurized air jets can push bearings 42A and 42B away from rail 30. Additionally, the space between rail 30 and bracket 44 can fill with pressurized air to form an air cushion. In examples, bearing assembly 40 can comprise air bearings configured according to U.S. Pat. No. 3,610,365 to Maddox et al., which is hereby incorporated by reference in its entirety.

Air bearings of the present disclosure can allow for utilization of levitation technology to guide and support habitation and transportation modules on circular rails. With air-bearings, there is no contact with the rails, hence there is no friction to overcome and no extraneous vibrations and acoustic noise generated that would disturb the modules. Propellent or thrust is required only to propel the modules to a constant speed on the circular rails. Air bearings can be attached to the modules or implemented within the circular rail.

Air bearing technology has successfully been developed for high precision motion control of a vehicle that did not create extraneous motion cues, enabling scientific experimentations to occur that are extremely sensitive to extraneous motion cues. See Mah, Robert (1988). "Threshold Perception of Whole-Body Motion to Linear Sinusoidal Stimulation" (doctoral thesis). Stanford University, Stanford, Calif. With such system, a voice coil (less than 1 lb. force) is used to propel and control the motion of the vehicle to create very accurate sinusoidal motion stimuli to conduct research such as human vestibular research. With the present disclosure, the application of air bearing technology to support the habitation modules as they travel around a circular rail will result in very precise artificial gravity (i.e., no extraneous motion cues). Moreover, the non-rotating large diameter wheel structure will not be subject to gyroscopic precession and nutation motion so the artificial gravity environment will be not be perturbed.

Figure 4:
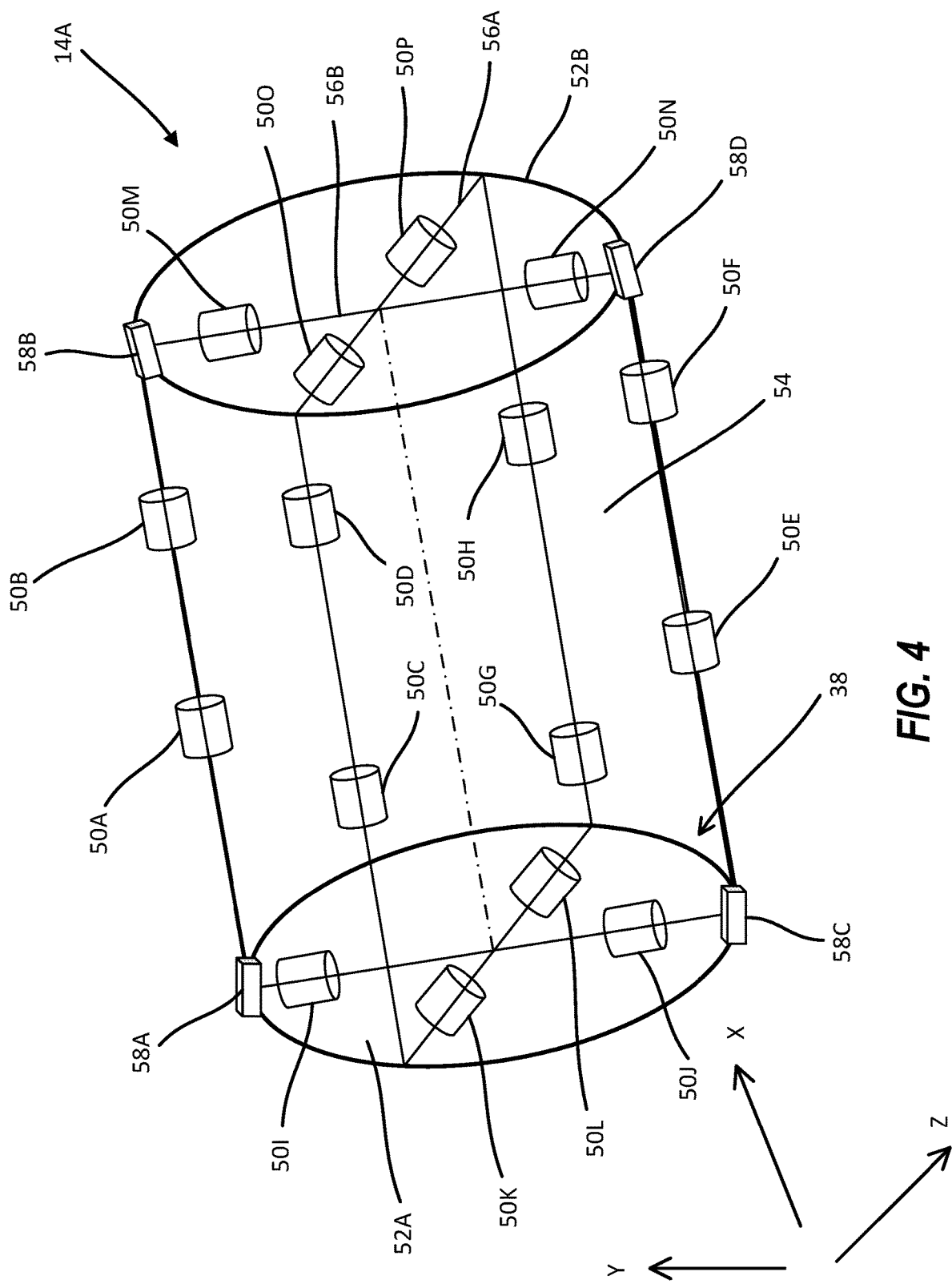
FIG. 4 is a schematic perspective view of a habitation module comprising a plurality of balancing elements positioned relative to habitation space, according to some embodiments.

FIG. 4 is a schematic perspective view housing 38 of habitation module 14A comprising a plurality of balancing elements 50A-50P positioned relative to habitation space. Housing 38 can be disposed in three-dimensional space as defined by X, Y and Z axes. Housing 38 can comprise end surfaces 52A and 52B and side surface 54. Surfaces 52A and 52B and side surface 54 can comprise a skin or outer layer of housing 38 within which is defined habitation space. Space within housing 38 can be divided into quadrants defined by planes 56A and 56B.

Figure 5B:
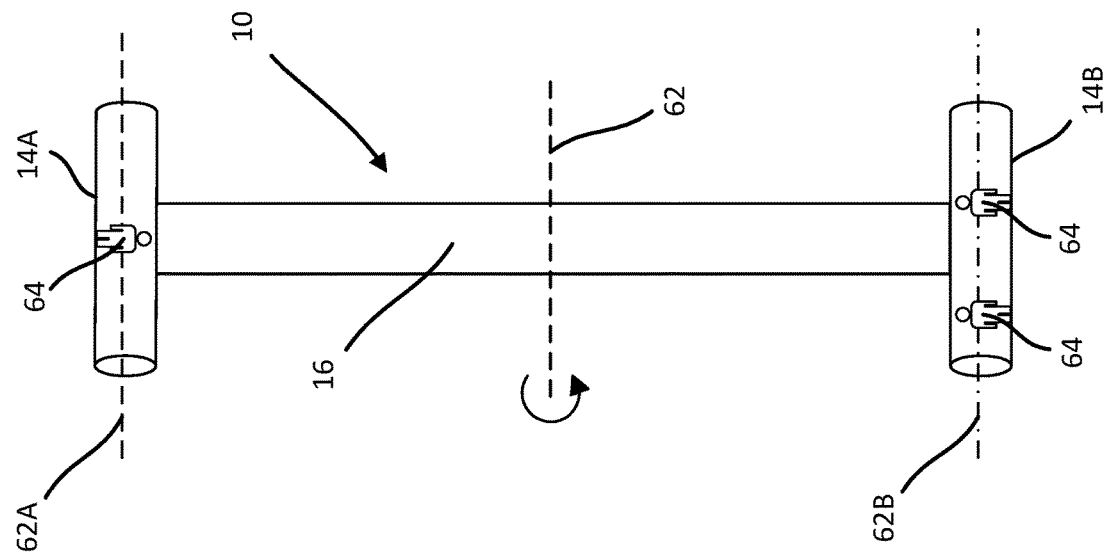
FIGS. 5A and 5B are schematic top and side views of habitation modules configured to orbit a spacecraft, respectively, showing habitation space axes of the habitation modules arranged relative to a rotation axis to minimize Coriolis effects, according to some embodiments.

As discussed herein, balancing elements 50A-50P can be adjusted in tandem on habitation modules 14A and 14B to reduce gyroscopic precession and nutation or wobble of spacecraft 10 relative to center 18 and axis 62 (FIG. 5B). Additionally, balancing elements 50A-50P can be adjusted on each of habitation modules 14A and 14B to individually balance habitation modules 14A and 14B relative to rail 30.

Space within housing 38 can be used for habitation or other purposes by occupants, e.g., personnel 64 (FIG. 5B). Thus, the space within housing 38 can include walls, ceilings, floors and the like, which are not illustrated for simplicity. The interior of housing 38 can be configured in any desirable manner. As such, housing 38 can be configured as a transportation module (e.g., transportation modules 72A and 72B of FIG. 6) or service module as described herein. Balancing elements 50A-50P can be connected to housing 38 so as to minimize with the occupiable or habitable space within housing 38. Balancing elements 50A-50P can be enclosed within walls of housing 38.

In some embodiments, balancing elements 50A-50P can comprise solid counterweights. Balancing elements 50A-50P can be configured to move to, for example, balance habitation module 14A. The process of balancing of habitation module 14A can be coordinated in conjunction with the process of balancing of habitation module 14B (FIG. 1). Thus, habitation modules 14A and 14B can be balanced to minimize or eliminate imbalance of spacecraft 10 as a whole. In particular, habitation modules 14A and 14B can be balanced to maintain the weight distribution of each of habitation modules 14A and 14B centered within each of habitation modules 14A and 14B so that the effects of habitation modules 14A and 14B on spacecraft 10 cancel each other out. Thus, as people and cargo move around within housing 38, balancing elements 50A-50P can be moved to maintain the center of gravity.

In other examples, the mass of one or more balancing elements 50A-50P can be changed, such as by pumping a liquid, such as water, into and out of balancing elements 50A-50P.

Additionally, as people and cargo move into and out of housing 38, solid or liquid-filled balancing elements can be subtracted and added to housing 38. For example, transport modules 72A and 72B (FIG. 6) can be used to transport additional balancing elements to and from housing 38. In additional examples, balancing elements 50A-50P can be added through non-contact injection of counterweights from frame 16 and removed through ejection of counterweights onto frame 16.

The mass balancing system can be operated continuously to reduce to acceptable levels any dynamic mass imbalances created in housing modules 14A and 14B due to, for example, movement of people and other activities.

In examples, balancing elements 50A-50P can be mounted on rails connected to the frame of housing 38. The position of balancing elements 50A-50P on such rails can be adjusted electromagnetically or mechanically, such as by using a chain and gear system. The positions of balancing elements 50A-50P can be controlled in real time using a spacecraft controller that coordinates operation of spacecraft 10 and habitation modules 14A and 14B. Habitation modules 14A and 14B, as well as each balancing element, can be provided with various sensors to provide feedback to and from the spacecraft controller (e.g., controller 150 of FIG. 13) to inform the positional adjustments of and caused by balancing elements 50A-50P. For example, housing 38 can be provided with sensors 58A-58D. In examples, sensors 58A-58D can comprise load sensors or load cells that can convert tension and compression forces into an electrical signal. A combination of three load sensors can be used to determine force and moment to determine mass properties of habitation module 14A. Balancing of habitation modules 14A and 14B can be initiated upon the beginning of their traveling about frame 16 such that modules 14A and 14B will be balanced with the final rate of revolution is reached.

With further reference to FIG. 4, in order to facilitate real-time and rapid balancing of habitation module 14A, balancing elements 50A-50P can be distributed about housing 38. Balancing elements 50A-50P can be grouped in pairs along opposite portions of the edges of planes 56A and 56B. Planes 56A and 56B can be perpendicular to each other. Balancing elements 50A and 50B can extend in the X direction on an upper edge of plane 56B. Balancing elements 50C and 50D can extend in the X direction on a side edge of plane 56A. Balancing elements 50E and 50F can extend in the X direction on a bottom edge of plane 56B. Balancing elements 50G and 50H can extend in the X direction on a side edge of plane 56A. Balancing elements 50I and 50J can extend in the Y direction on an end edge of plane 56B. Balancing elements 50K and 50L can extend in the Z direction on an end edge of plane 56A. Balancing elements 50M and 50N can extend in the Y direction on an end edge of plane 56B. Balancing elements 50O and 50P can extend in Z direction on an end edge of plane 56A.

Balancing elements 50A-50P can be balanced utilizing artificial intelligence (AI) technologies to perform dynamic mass balancing in near real-time. In examples, balancing elements 50A-50P can be operated according to procedures and methods described in the following publications, the contents of which are hereby incorporated by reference as if fully set forth herein:

a. Mah, R. W., Automated Centrifuge Balancing Using Neural Net/Fuzzy Logic Controllers-Mass Balancer Tradeoff Analysis, NASA Ames Research Center, September 1993;
  b. Wilson, E., Mah, R. W., Automatic Balancing and Intelligent Fault Tolerance for a Space-Based Centrifuge, AIAA Guidance, Navigation, and Control Conference, San Francisco, August 2005;
  c. Mah, R. W., et. al., Development of Telescope Balancing Methodologies for SOFIA, Astronomical Telescopes and Instrumentation, Kona, Hawaii, March 1998. Also published in Society of Photo-optical Instrumentation Engineers, Volume 3354-127; and d. Wilson, E., Mah, R. W., et. al., Imbalance Identification and Compensation for an Airborne Telescope, in Proceedings of the 1998 American Control Conference, Volume 2, pp. 856-860, Philadelphia, Pa., June 1998.

The present disclosure can utilize an "active interrogation" methodology that can safely and accurately determine the effect of mass imbalances on artificial gravity in space. The interrogation can provide space station controllers (e.g., controller 150 of FIG. 13) with operational constraints that can maintain artificial gravity at an acceptable level (e.g., size and location of people and group gatherings, and the number and quantity of people/supply transported to/from habitation modules.

The basic configuration for artificial gravity in space is paired habitation modules traveling at a constant velocity on opposite sides of a stationary circular rail while approximately 180 degrees apart, as described herein. The habitation modules can be balanced in real-time during the slow ramp-up from 0 velocity to the final velocity using the onboard mass balancing mechanisms, e.g., balancing elements 50A-50P. During this process, any mass imbalance will be small and will be minimized in real-time by the automated mass balancing mechanism. Such a process can produce an accurate artificial gravity level at the habitation modules, and the non-rotating large diameter platform can remain stationary.

"Active interrogation" is proposed as a way to determine how much mass imbalances can be tolerated (i.e., acceptable) before the artificial gravity level is negatively impacted, i.e., causing significant extraneous centrifugal force/moment vibrations, gyroscopic precession, and gyroscopic nutation. Active interrogation can involve generating a known mass imbalance using one (or more) of the counterweights (e.g., balancing elements 50A-50P) in the mass balancing mechanism onboard a habitation module. This way, a known mass imbalance will directly affect the artificial gravity, and the effects can be measured using load cells (e.g., sensors 58A-58D) mounted on the module's bearings, or directly using accelerometers.

Another way to generate a larger known mass imbalance is to use a single or a set of paired transport/servicing modules. A known mass can be added to a single transport/servicing module whose mass is known from load cell measurement of the forces on the module's bearings, or to a pair of (and balanced) transport/servicing modules. The transport/servicing module(s) can slowly ramp up from 0 velocity to the velocity before which the artificial gravity level becomes unacceptable. The effects of the mass imbalance can be measured using load cells mounted on the transport/servicing module's bearings, or directly using accelerometers.

In short, the knowledge gained from determining the effect of mass imbalances on artificial gravity in space can provide operational constraints that space station controllers (e.g., controller 150) can use to maintain artificial gravity level at an acceptable level.

Figure 5A:
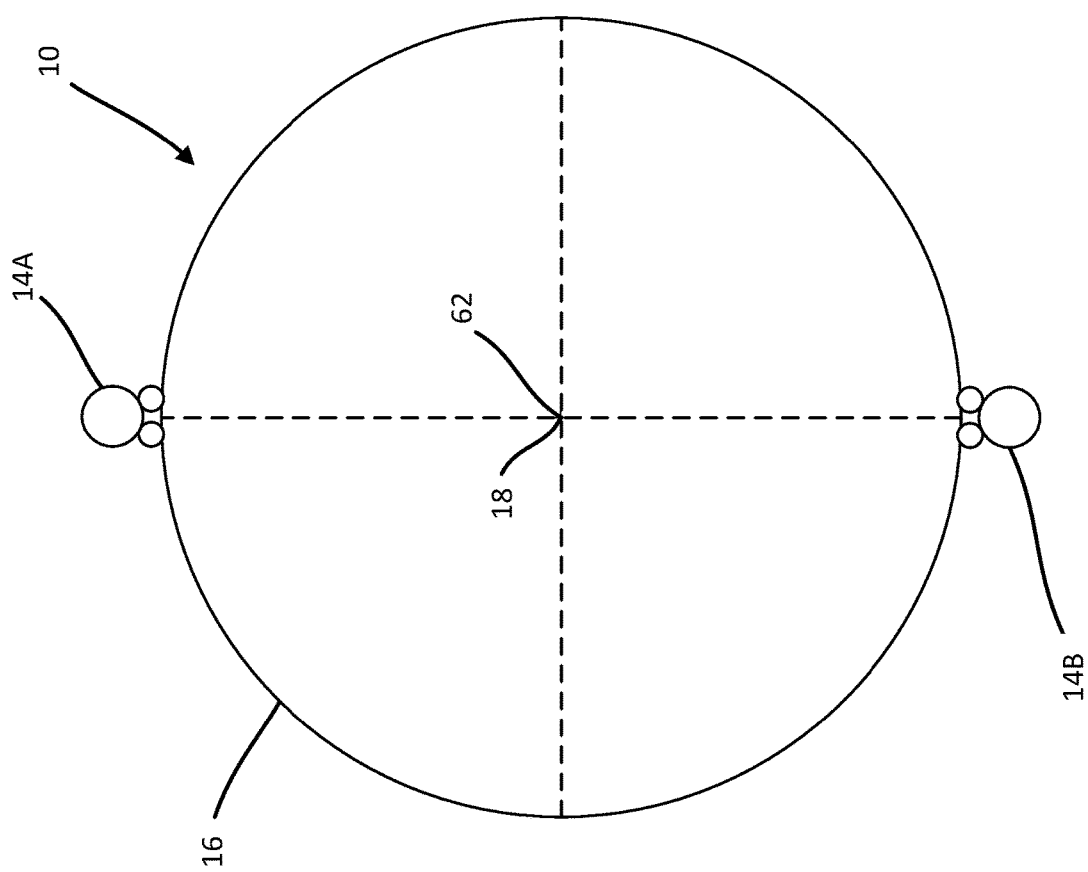

FIGS. 5A and 5B are schematic top and side views of habitation modules 14A and 14B configured to orbit spacecraft 10, respectively, showing habitation space axes 62A and 62B of habitation modules 14A and 14B relative to rotation axis 62. Personnel 64 can be located within habitation modules 14A and 14B.

Rotation axis 62 can extend through center 18 (FIG. 1) perpendicular to the plane of frame 16. Habitation modules 14A and 14B can be configured to travel along frame 16 in curvilinear motion about axis 62 as described herein to generate artificial gravity. As shown in FIG. 2 at arrow G1, artificial gravity can generate radially outward forces. As such, personnel 64 can be disposed within habitation modules 14A and 14B with their feet positioned radially outward of their heads from center 18 to simulate gravity.

The total acceleration experienced by personnel 64 (referred herein as "Artificial Gravity") can be defined by Eqs. 2-4.

$$\text{Total Acceleration} = \text{Artificial Gravity} + \text{Coriolis Force} + \text{Acceleration} \quad (2)$$

$$\text{Artificial Gravity} = \omega^2 r \quad (3)$$

$$\text{Coriolis Force} = 2\omega \times v \quad (4)$$

where:
ω(rpm): angular acceleration
r (m): radius
v (m/s): velocity

As is known, the Coriolis effect can result in an inertial force acting on an object within a frame of reference as the frame of reference rotates. Thus, with reference to FIG. 5, Coriolis forces are generated when personnel 64 moves along frame 16 in a habitation module. The Coriolis force is perpendicular to the direction of motion and perpendicular to the rotation axis 62. For motions in a plane perpendicular to rotational axis 62, the Coriolis force is in the same plane in FIG. 5A tangent to the artificial gravity forces, or to the left and right of habitation modules 14A and 14B in the plane of FIG. 5A. Coriolis forces are generated into and out of the plane. For motions in a plane perpendicular to the axis (62A, 62B) of the habitation modules, the Coriolis force is in the same plane in FIG. 5B. However, Coriolis effects are minimized for motions in the direction parallel to rotation axis 62 into and out of the plane of FIG. 5A and for motions in a direction parallel to the axis (62A, 62B) of the habitation modules to the left and right in FIG. 5B.

The orientation of the habitation modules 14A and 14B is an important factor in configuration. Human beings can experience the Coriolis effect as dizziness, nausea, disorientation, and the like. Coriolis forces are generated relative to the direction of motion to the rotation axis and the effects are thereby more pronounced as a human being moves in different directions relative to rotation axis 62 the Coriolis forces. For example, perpendicular movement toward/away from the rotational axis 62 within the rotational plane can exacerbate the Coriolis experience of a human being, while oblique movement within the rotational plane causes less Coriolis experience, and movement perpendicular to the rotational plane causes no Coriolis experience.

As such, according to some embodiments, habitation modules 14A and 14B can be constructed as narrow and long structures, and oriented perpendicular to the track of frame 16 in a T-configuration, such that personnel 64 primarily move into and out of the plane of FIG. 5A, and primarily leftwards and rightwards in as shown in FIG. 5B. Such configuration of habitation modules 14A and 14B is perpendicular to the typical configuration of a train car on a railroad. Habitation spaces axes 62A and 62B thus extend through elongate tubular bodies extending parallel to the rotation axis 62. The cross-sectional area of habitation modules 14A and 14B can be minimized to, for example, the height and width of a single level long and narrow building structure to eliminate large scale movement in the plane of rotation. Thus, movement of personnel 64 in directions that exacerbate Coriolis effects is minimized. With the orientation of habitation modules 14A and 14B illustrated in FIGS. 5A and 5B, personnel 64 move less in the direction toward/away/circumferentially to the rotation axis 62, the direction that causes Coriolis effects. With this orientation of habitation modules 14A and 14B, personnel 64 also move less in the plane the habitation modules are traveling on rail 30, the direction that causes Coriolis forces. For motions circumferentially in a plane that is perpendicular to the rotational axis 62, personnel 64 will experience an increase in artificial gravity force when moving in the spin direction of rotation axis 62, and a decrease in artificial gravity force when moving opposite the spin direction of rotation axis 62. Personnel 65 will move primarily along axes 62A and 62B of modules 14A and 14B, which is perpendicular to the direction modules 14A and 14B are traveling on rail 30, which is the direction that does not cause Coriolis effects.

Figure 6:
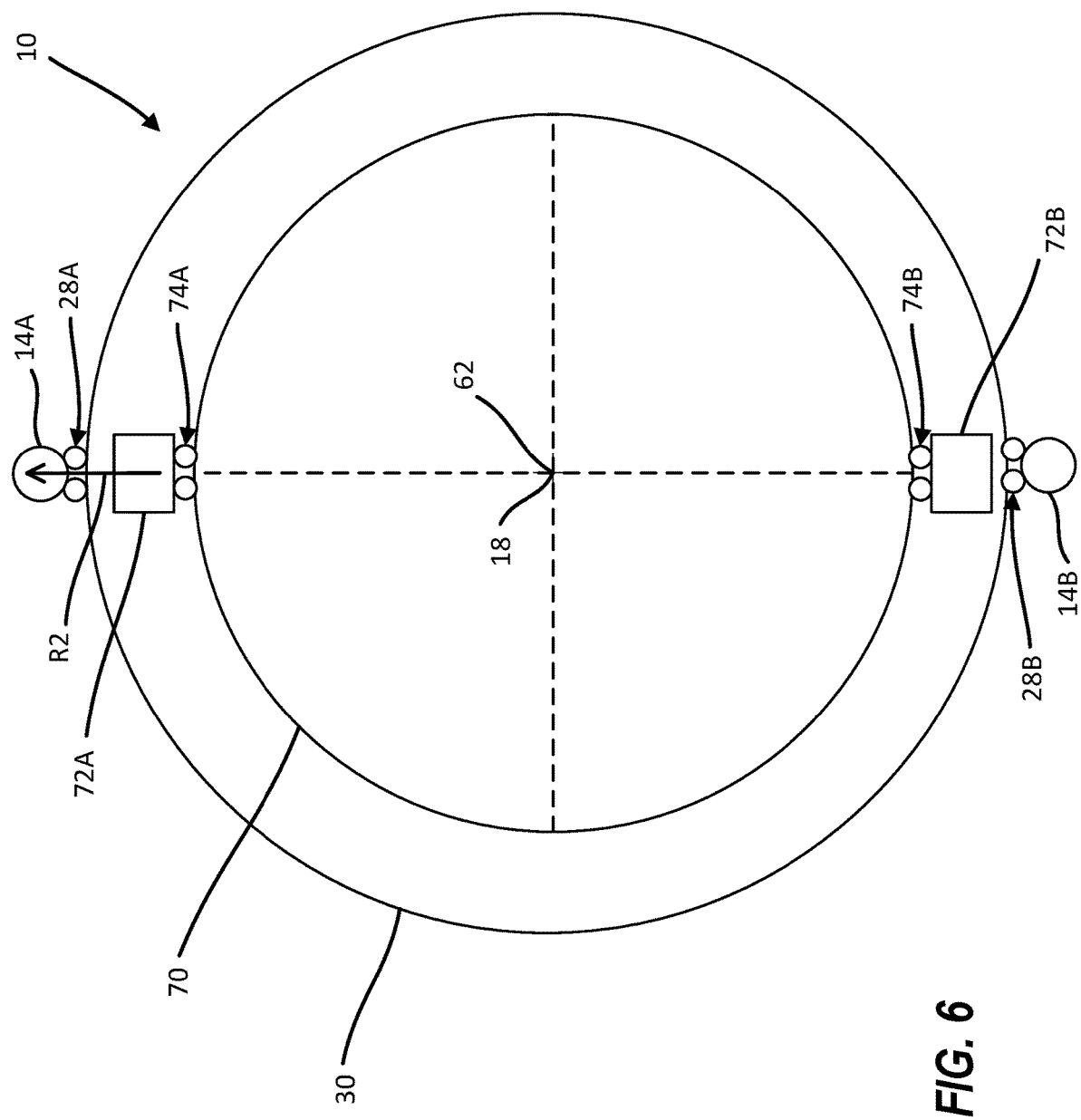
FIG. 6 is a schematic view of a spacecraft having concentric rails for habitation modules and transport modules, according to some embodiments.

FIG. 6 is a schematic view of spacecraft 10 having rail 30 and rail 70 located concentrically within rail 30. Habitation modules 14A and 14B can be configured to operate with rail 30, as was previously discussed. Transportation modules 72A and 72B can be configured to operate with rail 70. Habitation modules 14A and 14B can interact with rail 30 via bearing assemblies 28A and 28B, respectively. Transportation modules 72A and 72B can interact rail 70 via bearing assemblies 74A and 74B, respectively. Bearing assemblies 74 And 74B can be configured similarly as bearing assemblies 28A and 28B such that transportation modules 72A and 72B function with rail 70 in a similar manner as habitation modules 14A and 14B interact with rail 30. Rail 70 can be independently supported by frame 16 (not shown; see description with reference to FIG. 2) or can be connected to frame 16 through connection to rail 30.

Spacecraft 10 can be provided with rail 70 and transportation modules 72A and 72B as a system for facilitating interaction with habitation modules 14A and 14B. Transportation modules 72A and 72B can be provided as a pair configured to be operated opposite to one another, set to be one-hundred-eighty degrees apart, to minimize disturbance on spacecraft 10. Additionally, transportation modules 72A and 72B can be provided with a balancing system, as is described with reference to FIG. 4. Thus, transportation modules 72A and 72B can be configured to travel on rail 70 independently of habitation modules 14A and 14B. Transportation modules 72A and 72B can be configured to travel in the opposite direction as habitation modules 14A and 14B.

Transportation modules 72A and 72B can be configured to move personnel and cargo, such as from operations modules 12A-12K to habitation modules 14A and 14B. Though described as transportation modules, transportation modules 72A and 72B can be configured to perform a wide variety of functions related to or not related to transportation, such as providing servicing functions including waste removal or providing adjustment of balancing elements 50A-50P.

In examples, transportation modules 72A and 72B can be parked on rail 70 in positions to interact with operations modules 12A-12K. Thus, personnel of spacecraft 10 can operate in a zero-gravity environment to move cargo from a transport ship at a docking station of operations modules 12A-12K. Transportation modules 72A and 72B can be propelled, such as by the use of thrusters, to move about rail 70. The speed of transportation modules (e.g., the rotational speed about center 18, can be brought up to a speed that matches the speed of habitation modules 14A and 14B such that transportation modules 72A and 72B are radially inward of habitation modules 14A and 14B, respectively. As such, personnel and cargo of transportation can be considered stationary relative to habitation modules 14A and 14B such that exchange of personnel and cargo therebetween can be conducted in radial direction R2, such as by using appropriate transportation systems (e.g., transport device 144) discussed with reference to FIG. 12.

In sum, paired transportation modules 72A and 72B can operate by coming up to speed to habitation modules 14A and 14B, connecting thereto, beginning service procedures and transport operations, dis-connecting when all tasks are completed, and then slowing to a stop.

Figure 9:
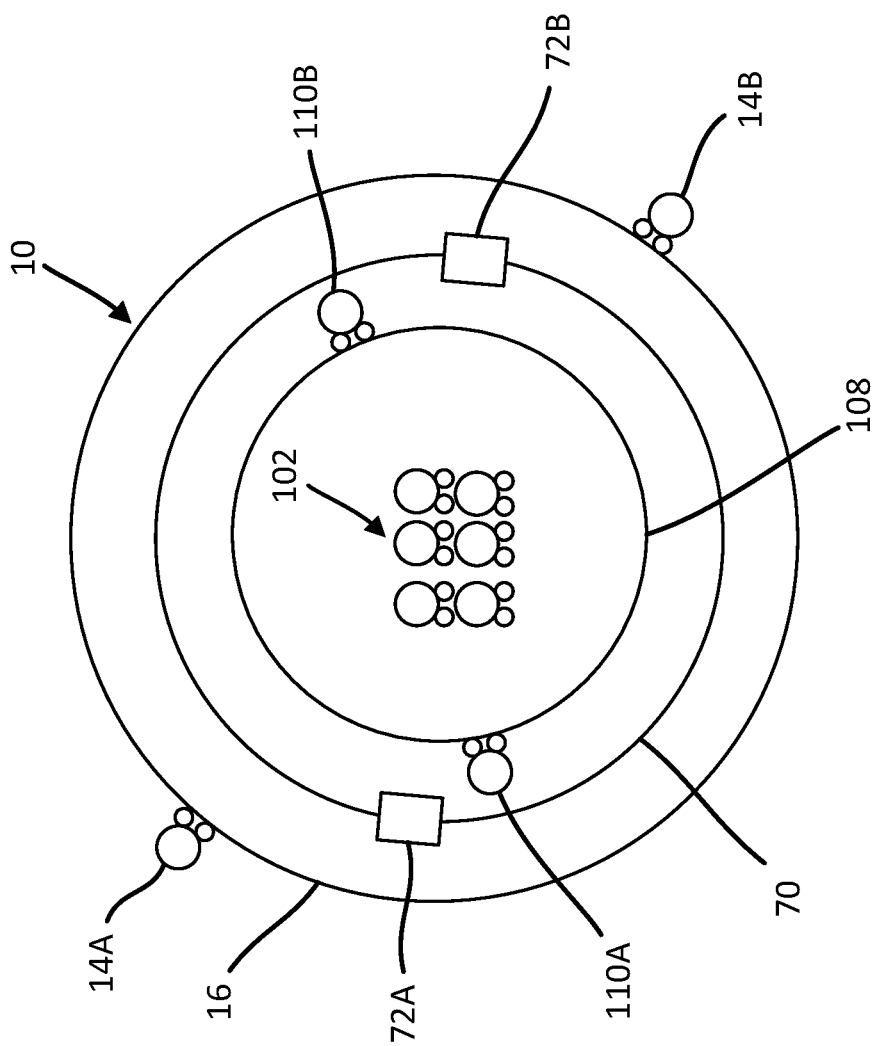
FIG. 9 is a schematic view of three concentric rails that can be used to provide habitation modules that generate different levels of gravity, according to some embodiments.

In examples, rail 70 can be provided concentrically outside of rail 30. As is shown in FIGS. 9 and 10, multiple levels of concentric tracks can be included in spacecraft 10.

Figure 7:
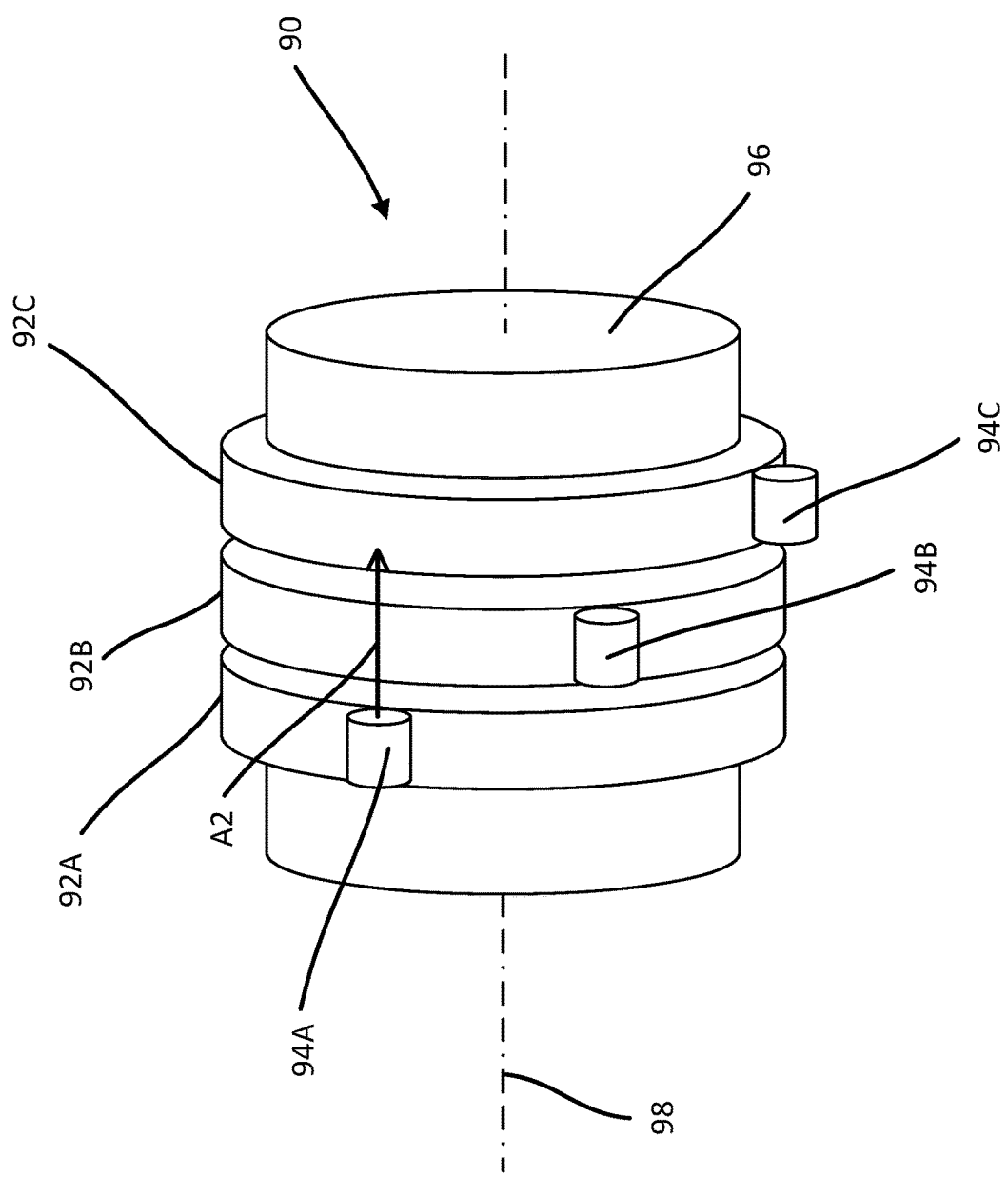
FIG. 7 is a schematic perspective view of a spacecraft having axially aligned rails for habitation modules and transport modules, according to some embodiments.
Figure 8:
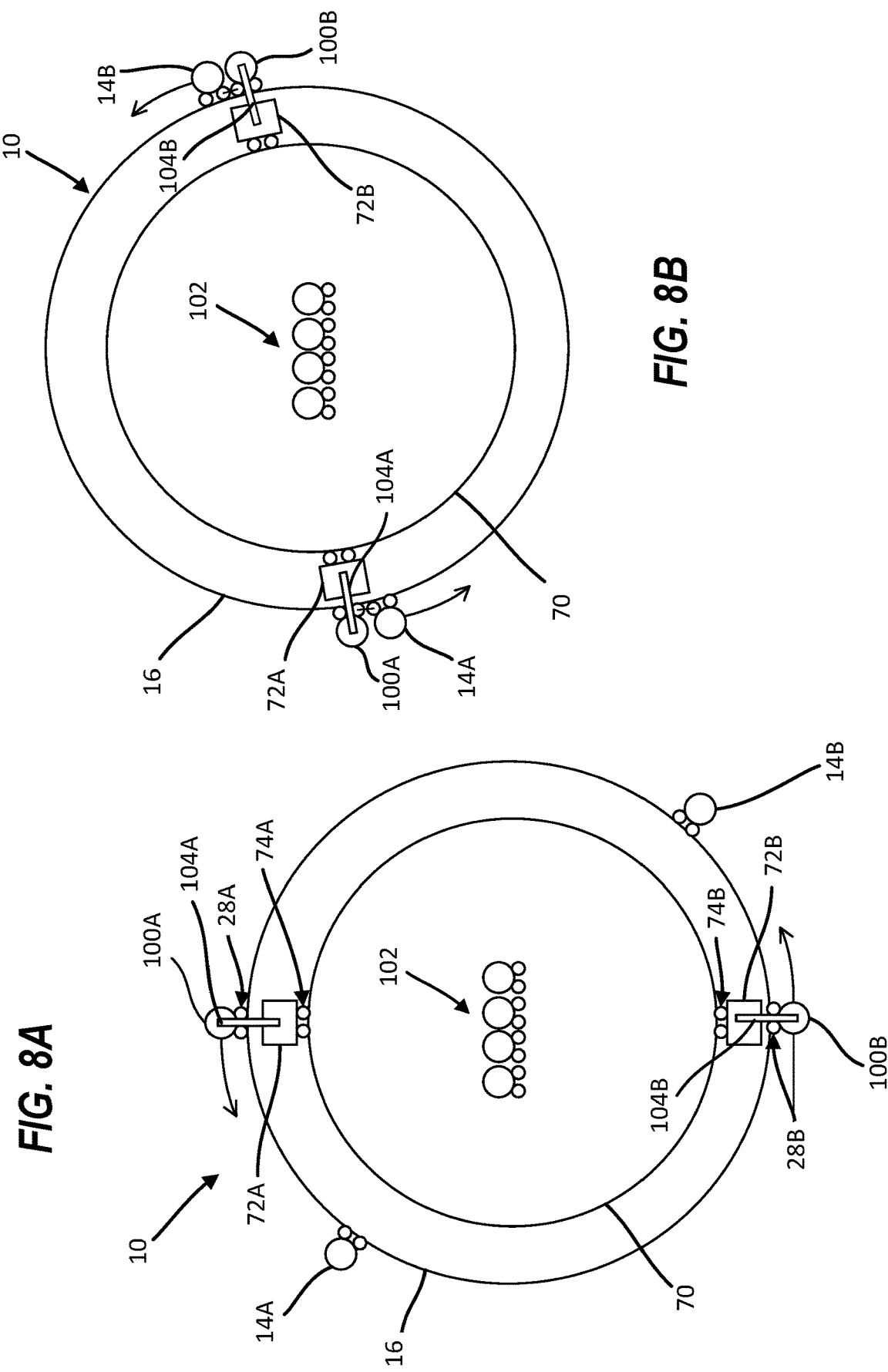
FIGS. 8A and 8B are schematic views showing attachment of additional habitation modules to orbiting habitation modules using transport modules on a radially inward rail, according to some embodiments.

FIG. 7 is a schematic perspective view of spacecraft 90 having axially aligned rails 92A, 92B and 92C for habitation modules 94A, 94B and 94C, respectively, and transport modules. Rails 92A, 92B and 92C can be mounted to frame 96. Each of habitation modules 94A, 94B and 94C can have a paired module one-hundred-eighty degrees apart. Spacecraft 90 illustrates a construction for spacecraft having multiple rail systems for, among other things, facilitating movement of personnel and cargo between modules aligning in axial directions, such as axial direction A2, as compared to FIGS. 6 and FIGS. 8A-12 that show radial movement of personnel and cargo.

Frame 96 can comprise a non-rotating cylindrical body that extends along axis 98. Habitation modules 94A-94C can travel about axis 98 on rails 92A-92C, respectively. Thus, the rotational speed of modules 94A-94C can be coordinated to axially align modules 94A-94C to facilitate transferring of personnel and cargo therebetween. Modules 94A-94C could also be moved in sync and connected to provide additional habitation space.

In examples, habitation modules 94A-94C can be operated to reduce or cancel momentum effects of each other. For example, habitation module 94A, as well as a paired habitation module set at 180 degrees from module 94A, can be configured to travel in a clockwise direction, and habitation module 94C, as well as a paired habitation module set at 180 degrees from module 94C, can be configured to travel in a counterclockwise direction to generate momentum that offsets momentum generated by habitation module 94A. Habitation module 94B, as well as a paired habitation module set at 180 degrees from module 94B, can be operated intermittently as a transportation module to service habitation modules 94A and 94C.

FIGS. 8A and 8B are schematic views showing attachment of additional habitation modules 100A and 100B to orbiting habitation modules 14A and 14B using transport modules 72A and 72B on a radially inward rail 70. Spacecraft 10 can additionally include stored habitation modules 102 that are mounted to the inner structures of frame 16.

Habitation module 100A can be moved from a storage area within an inner structure of frame 16 to a rail on frame 16 via any suitable manner. In examples, spacecraft 10 can be provided with an elevator system to move habitation module 100A to a rail of frame 16. Habitation module 100A can be coupled to transportation module 72A via coupling 104A. Transportation module 72A can be accelerated slowly up to the speed of habitation module 14A to bring habitation module 100A into engagement with habitation module 14A. Thereafter, a coupling device, such as coupling hitches 24A and 26A (FIG. 2), can be used to attach habitation module 100A to habitation module 14A. Subsequently, transportation module 72A can detach from habitation module 100A.

Habitation module 100B can be moved from a storage area within frame 16 to frame 16 via any suitable manner. In examples, spacecraft 10 can be provided with an elevator system to move habitation module 100B to frame 16. Habitation module 100B can be coupled to transportation module 72B via coupling 104B. Coupling 104B can comprise a docking system, such as appropriate scaffolding and the like. Additionally, coupling 104B can comprise an elevator or other transport device, such as a tunnel, to facilitate transfer of personnel and cargo between transportation module 72B and habitation module 14B. Transportation module 72B can be accelerated slowly up to the speed of habitation module 100B to bring habitation module 100B into engagement with habitation module 14B. Thereafter, a coupling device, such as coupling hitches 24A and 26A (FIG. 2), can be used to attach habitation module 100B to habitation module 14B. Subsequently, transportation module 72B can detach from habitation module 100B and decelerate to a stop.

FIGS. 8A and 8B illustrate one specific example of concentric frames and tracks. However, other arrangements can be used. For example, frame 16 and rail 70 could be axially aligned, similar to what is shown in FIG. 7. In another example, rail 70 could be arranged radially outward of frame 16 with transportation modules 72A and 72B operating radially inward of rail 70, and rail 70 could be arranged radially outward of frame 16 with transportation modules 72A and 72B operating on rail 70 (as shown in FIG. 9), instead of hanging from rail 70.

FIG. 9 is a schematic view of three concentric module tracks 16, 70 and 108 that can be used to generate different levels of gravity for habitation modules 14A and 14B and habitation modules 110A and 110B. Transportation modules 72A and 72B can be used concentrically between habitation modules 14A and 14B and habitation modules 110A and 110B to exchange cargo therewith and perform other functions. As with the configuration of FIG. 7, habitation modules 14A and 14B can be configured to travel in the opposite direction as habitation modules 110A and 110B to offset generated momentum.

FIG. 9 illustrates a configuration of spacecraft 10 where independent sets of habitation modules can travel at different velocities. For example, habitation modules 110A and 110B can travel in curvilinear motion with an angular acceleration that generates artificial gravity simulating a 1G environment, and habitation modules 14A and 14B can travel with an angular acceleration that generates artificial gravity simulating a 0.4G environment. Thus, habitation modules 110A and 110B can be operated independently of habitation modules 14A and 14B without risk of collision. Transportation modules 72A and 72B can be selectively used to service either of habitation modules 110A and 110B and habitation modules 14A and 14B.

FIG. 9 additionally illustrates a configuration for transportation modules 72A and 72B that allow for servicing of outer and inner habitation modules. Transportation modules 72A and 72B can be configured to ride concentrically on rail 70 such that outer portions of transportation modules 72A and 72B can reach, such as with the aid of a transport device like coupling 104A, habitation modules 14A and 14B, and inner portions of transportation modules 72A and 72B can reach, such as with the aid of a transport device like coupling 104A, habitation modules 110A and 110B.

FIG. 10 is a schematic view of a plurality of habitation modules 14A and 14B and habitation modules 110A and 110B being linked in trains on different tracks 16 and 108. Trains of habitation modules 14A and 14B and habitation modules 110A and 110B can be linked using coupling devices, such as coupling hitches 24A and 26A (FIG. 2). Additionally, trains of habitation modules 14A and 14B and habitation modules 110A and 110B can include portals 112 between and joining the modules to allow movement of personnel and cargo between modules. In some embodiments, portals 112 can be configured with folding bellows forming doorways or tunnels, where the folding bellows can be extended between modules when in used and contracted and stowed when the modules are not connected in trains. In some embodiments, portals 112 can be constructed of any enclosing material capable of withstanding the pressurized environment of the modules for human survival in space, including rigid or flexible materials.

Figure 11:
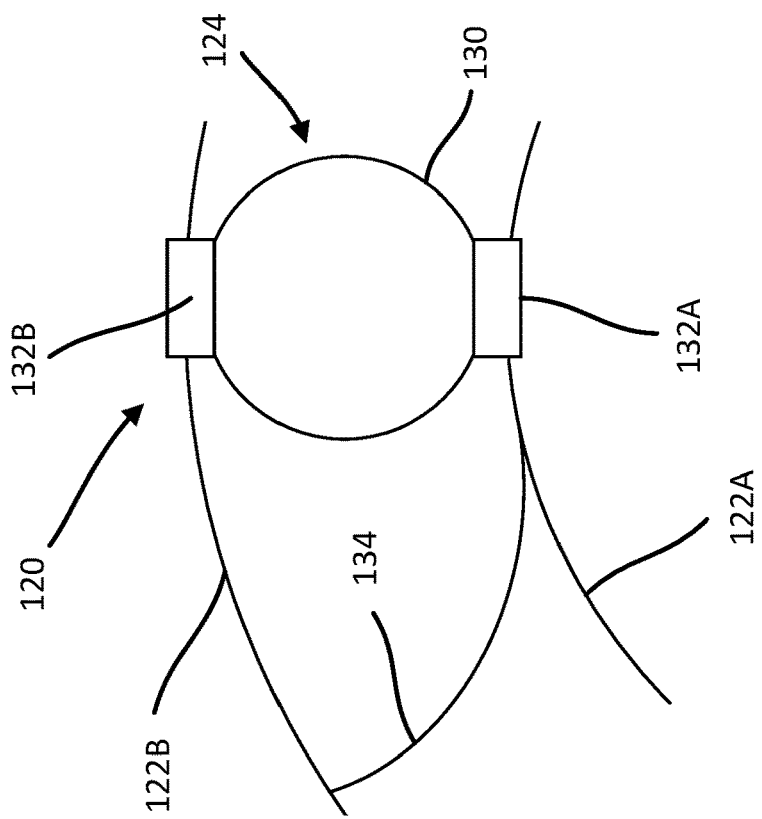
FIG. 11 is a schematic view of concentric rails illustrating a habitation module linked to outer and inner rails, according to some embodiments.

FIG. 11 is a schematic view of spacecraft 120 comprising concentric rails 122A and 122B, habitation module 124 linked to rails 122A and 122B. Habitation module 124 can be configured as habitation module 14A described herein. Thus, habitation module 124 can comprise housing 130 and inner chassis 132A that can connect to inner rail 122A and outer chassis 132B that can connect to outer rail 122B. Chassis 132A and chassis 132B can connect to inner and outer rails 122A and 122B, respectively, via any suitable mechanism described herein, such as bearing assembly 40. As such, habitation module 124 can be configured to selectively operate with both or only one of rails 122A and 122B. For example, rails 122A and 122B can be connected with spoke rail 134. Spoke rail 134 can comprise a curved track that can be selectively engaged by habitation module 124 to cause movement of habitation module 124 between rails 122A and 122B.

FIG. 12 is a schematic view of spacecraft 120 comprising transportation module 126 transferring cargo from inner rail 122A to habitation module 128 on outer rail 122B.

Transportation module 126 can be configured as transportation module 72A described with reference to FIG. 10. Transportation module 126 can comprise housing 138 and inner chassis 136 that can connect to inner rail 122A. Chassis 136 can connect to inner rail 122A via any suitable mechanism described herein, such as bearing assembly 40, as described with reference to FIG. 3. Habitation module 128 can be configured as habitation module 14A described herein. Thus, habitation module 128 can comprise housing 142 and chassis 140 that can connect to outer rail 122B. Chassis 140 can connect to outer rail 122B via any suitable mechanism described herein, such as bearing assembly 40. As such, transportation module 126 and habitation module 128 can be configured to operate in a configuration where rails 122A and 122B provide radially outward barriers for the operation of modules 128 and 126. Transport device 144 can connect housing 136 and housing 138. Transport device 144 can be used to move personnel and cargo between housing 142 and housing 138. In examples, transport device 144 can comprise an elevator comprising a shaft with a car that can move therein. In examples, transport device 144 can comprise a tunnel with or without a stairway.

Figure 13:
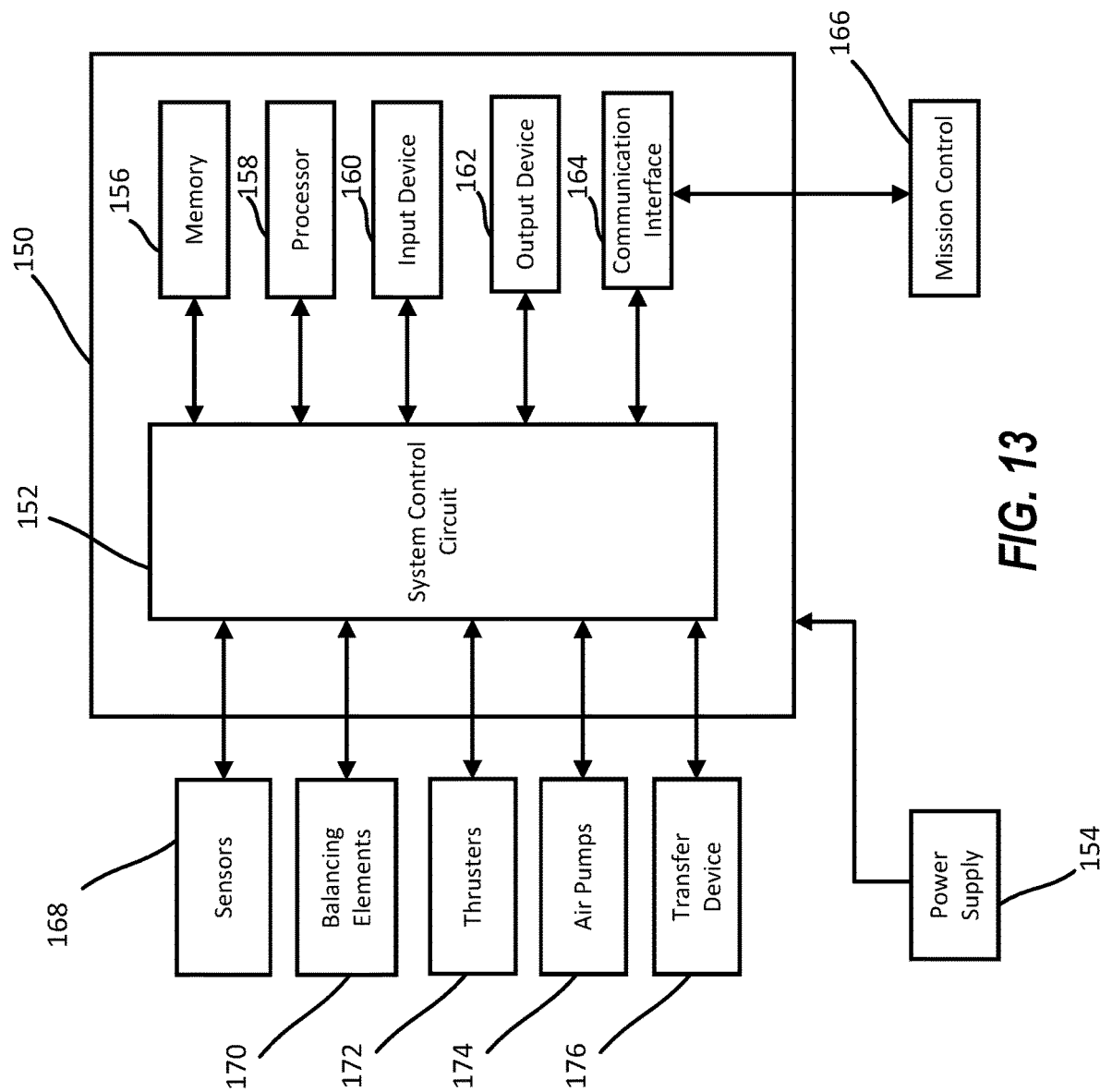
FIG. 13 is a schematic diagram illustrating components of a controller for the spacecraft with artificial gravity modules described with reference to FIGS. 1-12 and with which any methods described herein can be executed, according to some embodiments.

FIG. 13 is a schematic diagram illustrating components of controller 150 for spacecraft 10 of FIGS. 1-12 and with which any of the methods described herein can be executed. Controller 150 can include circuit 152, power supply 154, memory 156, processor 158, input device 160, output device 162 and communication interface 164. Controller 150 can provide instructions to spacecraft 10 for controlling operations of habitation modules 14A and 14B and, in particular, balancing of habitation modules 14A and 14B, as well as other modules such as transportation modules 72A and 72B, and spacecraft 10. Controller 150 can also be in communication with sensors 168 (e.g., sensors 58A-58D), balancing elements 170 (e.g., balancing elements 50A-50B), thrusters 172 (e.g., thrusters 20A and 20B), air pumps 174 (e.g., air source 46), and transfer devices 176 (e.g., transport device 144) and other systems and components of spacecraft 10. For example, spacecraft 10 can be equipped with a wide variety of sensors to enable reliable, fail-safe, and autonomous/semi-autonomous operations.

Controller 150 can be configured to control the balancing processes carried out in habitation modules 14A and 14B using balancing elements 50A-50P and sensors 58A-58D, as well as the overall operation of spacecraft 10, including the rotation of habitation modules 14A and 14B. Controller 150 can control the rotational or orbital speed of modules 14A and 14B and modules 72A and 72B to control Coriolis effects. Controller 150 can be operated with input from mission control 166 to coordinate operation (e.g., attitude/navigation control) of spacecraft 10.

Controller 150 can include various computer system components that facilitate receiving and issuing electronic instructions, storing instructions, data and information, communicating with other devices, display devices, input devices, output devices and the like.

Circuit 152 can comprise any suitable computer architecture such as microprocessors, chips and the like that allow memory 156, processor 158, input device 160, output device 162 and communication interface 164 to operate together. Power supply 154 can comprise any suitable method for providing electrical power to controller 150, such as AC or DC power supplies. Memory 156 can comprise any suitable memory device, such as random access memory, read only memory, flash memory, magnetic memory and optical memory. Input device 160 can comprise a keyboard, mouse, pointer, touchscreen and other suitable devices for providing a user input or other input to circuit 152 or memory 156. Output device 162 can comprise a display monitor, a viewing screen, a touch screen, a printer, a projector, an audio speaker and the like. Communication interface 164 can comprise devices for allowing circuit 152 and controller 150 to receive information from and transmit information to other computing devices, such as a modem, a router, an I/O interface, a bus, a local area network, a wide area network, the internet and the like.

Circuit 152 can communicate with, that is, read from and write to, a memory device such as memory 156. Memory 156 can include various computer readable instructions for implementing operation of spacecraft 10. Thus, memory 156 can include instructions for monitoring requests from mission control 166. Memory 156 can include various computer readable instructions for implementing operation of spacecraft 10. Thus, memory 156 can include instructions for solving Equations 1-3 for balancing of various modules and spacecraft 10 and the generation of artificial gravity control. Output of sensors 168 can be provided to circuit 152 for solving Equations 1-3.

In examples, the present disclosure utilizes paired habitation modules 180 degrees apart traveling on a circular rail to house the space inhabitants. This paired configuration minimizes any mass imbalance that would perturb the 0G environment of the vehicle. The present disclosure also uses paired service/transport modules 180 degrees apart traveling on an adjacent circular rail to service and transport space inhabitant to and from the habitation modules. This paired configuration minimizes any mass imbalance that would perturb the 0G environment of the vehicle. In the present disclosure, the mass balancing task is much simpler when compared to mass balancing a rotating vehicle, such as designs for space stations or modules to rotate their whole structure, from center to edge. This is because in the present embodiments, load sensors and/or tension sensors mounted on each traveling module are used to directly measure the load of the module. These measurements are used to determine the mass imbalance between the paired modules. The mass balancing system in each module operates continuously to reduce the net mass imbalance between the paired modules to an acceptable level. In contrast, mass balancing a whole rotating segment or structure entails complex motion analysis to estimate the mass imbalances and to determine how to mass balance the rotating vehicle. Moreover, larger counterweights and a complex network of mass balancing mechanisms are required to minimize the mass imbalances. Whereas in the present embodiments, the mass balancing system onboard each module is simpler and compact.

With the concepts of the present disclosure, spacecrafts can be built that are affordable in the near term, then add additional capabilities can be added when funding is available. The concepts of the present disclosure are very cost-effective and allow for the building of a minimum system to produce artificial gravity in space at the time of construction of the initial structure, without having to wait for a full structure to be built. An additional benefit is that construction and assembly of new capabilities can be performed without disrupting the ongoing artificial gravity environment of the existing structure. Furthermore, the concepts of the present disclosure simplify the implementation of important systems, such as articulated solar power systems, heat rejection systems, guidance, navigation and control systems, etc. In comparison, it is very challenging to add new capabilities to a rotating space station because of the mass imbalance problem it produces.

The present disclosure has several major benefits. Spacecraft described herein are practical and cost-effective in that they enable early implementation of artificial gravity in space, starting with a minimal configuration of 1) one set of paired habitation modules, 2) one set of paired service/transport modules, and 3) two circular rails around the circumference of a non-rotating large diameter wheel structure. This basic configuration can be easily expanded over time to accommodate more space inhabitants and more capabilities without perturbing the ongoing artificial gravity.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of generating artificial gravity environments in spacecraft modules, the method comprising:
    operating a frame in space, the frame forming a portion of a spacecraft, the frame having a first track defining a center and a rotation axis extending through the center, the first track defining a path surrounding the center;
    engaging a first module and a second module to the first track of the frame, the first module configured to engage the first track to travel along the first track in a circular-type path with curvilinear motion and generate an artificial gravity environment within the first module, and a second module configured to engage the first track at a location relative to the first module that minimizes mass imbalance for the spacecraft, the second module configured to travel along the first track in the circular-type path with curvilinear motion and generate an artificial gravity environment within the second module; and
    mass balancing the first module relative to the second module to reduce gyroscopic precession and nutation or wobble of the frame, wherein said mass balancing comprises:
        sensing load imbalance between the first and second modules; and
        adjusting weight distribution of the first and second modules.

2. The method of claim 1, wherein operating the frame in space comprises orbiting the frame about a lunar or planetary mass.

3. The method of claim 1, wherein operating the frame in space comprises propelling the frame through space.

4. The method of claim 1, wherein while traveling at normal operating speeds for generating artificial gravity, the first and second modules are arranged on substantially opposites sides on the first track at positions that minimizes mass imbalance for the spacecraft.

5. The method of claim 1, wherein the first and second modules comprise habitation modules.

6. The method of claim 1, wherein the frame is maintained stationary relative to frames of reference of the first and second modules while the frame and the first and second modules move together through space.

7. The method of claim 1, wherein engaging the first and second modules includes using air bearings between the first track and attachment points of the first and second modules.

8. The method of claim 1, the method further comprising operating the first and second module, wherein operating the first and second modules comprises accelerating the first and second modules along the first track to travel at a maximum rate of about two revolutions per minute about the center.

9. The method of claim 1, wherein operating the first and second modules comprises maintaining the first and second modules at a distance from the center at least seven hundred feet.

10. The method of claim 1, wherein sensing load imbalance between the first and second modules comprises sensing force and moment in at least one of the first and second modules.

11. The method of claim 1, wherein sensing load imbalance between the first and second modules comprises sensing acceleration of at least one of the first and second modules.

12. The method of claim 1, wherein adjusting weight distribution of one of the first and second modules comprises adding or subtracting weight from the one of the first and second modules.

13. The method of claim 1, wherein adjusting weight distribution of one of the first and second modules comprises adjusting a position of a weight mounted to the one of the first and second modules.

14. The method of claim 1, wherein adjusting weight distribution of one of the first and second modules comprises pumping a fluid into or out of the one of the first and second modules.

15. The method of claim 1, wherein adjusting weight distribution of the one of the first and second modules comprise actively interrogating sensors measuring mass distribution of the first and second modules.

16. The method of claim 1, further comprising:
operating a transport module to travel about the frame offset on a different track or rail from the first and second modules;
accelerating the transport module to a velocity and position that align with one or more of the first or second modules; and
transferring cargo from the transport module to the one or more of the first or second modules.

17. The method of claim 1, further comprising:
operating a third module to travel about the frame offset on a different track or rail from the first and second modules; and
accelerating the third module to a different rate than the first and second transport modules.

18. The method of claim 17, further comprising operating the third module, and a fourth module paired with the third module, substantially opposite the first and second modules to minimize mass imbalance of the frame.

19. The method of claim 1, wherein one or both of the first or second module comprises an elongate tubular body extending along a habitation axis, wherein the habitation axis is parallel with the rotation axis.

* * * * *